US012520985B2

(12) United States Patent
Büsing et al.

(10) Patent No.: US 12,520,985 B2
(45) Date of Patent: Jan. 13, 2026

(54) DISHWASHER

(71) Applicant: SAMSUNG ELECTRONICS CO., LTD., Suwon-si (KR)

(72) Inventors: Johannes Büsing, Suwon-si (KR); Jisun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 18/140,803

(22) Filed: Apr. 28, 2023

(65) Prior Publication Data

US 2024/0335085 A1 Oct. 10, 2024

Related U.S. Application Data

(63) Continuation of application No. PCT/KR2023/004694, filed on Apr. 7, 2023.

(30) Foreign Application Priority Data

Jun. 30, 2022 (KR) ........................ 10-2022-0080948

(51) Int. Cl.

*A47L 15/42* (2006.01)
*A47L 15/14* (2006.01)
*F16L 21/035* (2006.01)

(52) U.S. Cl.

CPC ........... *A47L 15/4217* (2013.01); *A47L 15/14* (2013.01); *A47L 15/4225* (2013.01); *F16L 21/035* (2013.01)

(58) Field of Classification Search

None

See application file for complete search history.

(56) References Cited

U.S. PATENT DOCUMENTS

| | | | |
|---|---|---|---|
| 9,339,167 | B2 | 5/2016 | Kim et al. |
| 10,702,122 | B2 | 7/2020 | Lee et al. |

(Continued)

FOREIGN PATENT DOCUMENTS

| | | | |
|---|---|---|---|
| EP | 0 243 632 | A2 | 11/1987 |
| EP | 2 323 535 | B1 | 6/2017 |

(Continued)

OTHER PUBLICATIONS

International Search Report dated Jul. 31, 2023 for International Application No. PCT/KR2023/004694.

(Continued)

*Primary Examiner* — Rita P Adhlakha

(74) *Attorney, Agent, or Firm* — STAAS & HALSEY LLP

(57) ABSTRACT

Disclosed herein is a dishwasher. The dishwasher includes a washing chamber, a spray unit configured to spray wash water into the washing chamber, a distribution chamber including a lower port through which wash water flows in and out, a distribution cover configured to cover the distribution chamber and including an upper port connected to the spray unit to supply the wash water in the distribution chamber to the spray unit, a guide member connected to the lower port of the distribution chamber so as to guide wash water, and a support detachably coupled to a lower side of the distribution chamber. The support includes a holder formed in a hollow shape and configured to hold one side of the guide member, and a coupler formed on the holder to fix the guide member so as to allow the guide member to correspond to the lower port through the holder.

17 Claims, 22 Drawing Sheets

(56) References Cited

U.S. PATENT DOCUMENTS

| | | | |
|---|---|---|---|
| 10,842,344 B2* | 11/2020 | Kim | A47L 15/0047 |
| 10,939,794 B2 | 3/2021 | Hahm et al. | |
| 10,980,394 B2 | 4/2021 | Woo et al. | |
| 11,357,383 B2 | 6/2022 | Shin et al. | |
| 11,737,639 B2 | 8/2023 | Büsing et al. | |
| 2011/0056527 A1 | 3/2011 | Classen et al. | |
| 2011/0088733 A1 | 4/2011 | Büsing et al. | |
| 2013/0319482 A1 | 12/2013 | Vallejo Noriega et al. | |
| 2015/0182096 A1 | 7/2015 | Kim | |
| 2015/0265131 A1 | 9/2015 | Brignone | |
| 2020/0205639 A1* | 7/2020 | Büsing | A47L 15/4246 |
| 2021/0404910 A1 | 12/2021 | Durham | |

FOREIGN PATENT DOCUMENTS

| | | |
|---|---|---|
| KR | 10-0662156 B1 | 12/2006 |
| KR | 10-2007-0078119 | 7/2007 |
| KR | 10-2012-0022426 | 3/2012 |
| KR | 10-2017-0016181 A | 2/2017 |
| KR | 10-2018-0129287 A | 12/2018 |
| KR | 10-2019-0096165 A | 8/2019 |
| KR | 10-2019-0103680 A | 9/2019 |
| KR | 10-2020-0012710 | 2/2020 |
| KR | 10-2127709 | 6/2020 |
| KR | 10-2020-0083113 A | 7/2020 |
| KR | 10-2373181 B1 | 3/2022 |

OTHER PUBLICATIONS

Written Opinion of the International Searching Authority dated Jul. 31, 2023 for International Application No. PCT/KR2023/004694.

Extended European Search report dated May 13, 2025 for European Application No. 23831680.6.

* cited by examiner

DISHWASHER

CROSS-REFERENCE TO RELATED APPLICATION(S)

This application is a continuation application, under 35 U.S.C. § 111 (a), of international application No. PCT/KR2023/004694, filed on Apr. 7, 2023, which claims priority to Korean Patent Application No. 10-2022-0080948, filed on Jun. 30, 2022, in the Korean Intellectual Property Office, the disclosures of which are incorporated by reference herein in their entireties.

BACKGROUND

1. Field

The disclosure relates to a dishwasher including an improved structure.

2. Description of Related Art

A dishwasher is a device that automatically washes food residues and the like on dishes using detergent and wash water.

The dishwasher includes a tub provided to form a washing space, a sump provided to collect wash water, a pump pumping wash water in the sump, a spray device provided to spray wash water into the tub, a distribution device provided to selectively deliver the wash water to the spray device, and a connector provided to guide wash water from the pump to the distribution device. The dishwasher may include a water tank provided to store wash water and a valve assembly provided to open and close a flow path between the sump and the water tank.

Some components of the dishwasher may be easily separated by the pump's high pumping pressure. In general, a separate process (e.g., insert injection, etc.) or a separate component (e.g., clamp, etc.) may be required to prevent separation of these components.

SUMMARY

Aspects of embodiments of the disclosure will be set forth in part in the description which follows and, in part, will be apparent from the description, or may be learned by practice of the presented embodiments.

In accordance with an aspect of the disclosure a dishwasher includes a washing chamber, a spray unit configured to spray wash water into the washing chamber, a distribution chamber including a lower port through which wash water flows in and out, a distribution cover configured to cover the distribution chamber and including an upper port connected to the spray unit to supply the wash water in the distribution chamber to the spray unit, a guide member connected to the lower port of the distribution chamber so as to guide wash water, and a support detachably coupled to a lower side of the distribution chamber. The support includes a holder formed in a hollow shape and configured to hold one side of the guide member, and a coupler formed on the holder to fix the guide member so as to allow the guide member to correspond to the lower port through the holder.

The holder of the support may have a predetermined height.

The coupler of the support may protrude upward from the holder.

The dishwasher may further include a water storage chamber provided to store wash water in the washing chamber, and a pump configured to pump wash water from the water storage chamber to the distribution chamber. The guide member may be provided to connect the pump and the lower port.

The guide member may include a connection flange configured to be coupled to an outer surface of the lower port, and an extension portion extending from the connection flange to be locked to the coupler, so as to cover at least a portion of the holder.

The extension portion may include a first extension portion extending radially outward from an upper end of the connection flange to cover an upper end of the holder, and a second extension portion extending downward from the first extension portion to cover an outer surface of the holder.

The coupler of the support may include a plurality of coupling protrusions protruding upward from the upper end of the holder. The guide member may include a plurality of coupling protrusion holes. The plurality of coupling protrusions may be configured to be inserted into the plurality of coupling protrusion holes.

The coupler of the support may protrude from an inner surface of the holder.

The dishwasher may further include a water tank provided to store the wash water in the distribution chamber. The guide member may be configured to connect the lower port and the water tank.

The guide member may further include a connection pipe coupled to an inner surface of the lower port, and a plurality of first locking protrusions protruding radially outward from an outer surface of the connection pipe and arranged spaced apart from each other. The coupler of the support may further include a plurality of second locking protrusions protruding radially inward from an inner surface of the holder and arranged spaced apart from each other, and a plurality of locking protrusion grooves arranged between two mutually adjacent second locking protrusions among the plurality of second locking protrusions.

The connection pipe may be rotatable between a first position, in which the connection pipe is inserted into the holder to allow the plurality of first locking protrusions of the guide member to pass through the plurality of locking protrusion grooves of the holder, and a second position in which the plurality of first locking protrusions are supported by the plurality of second locking protrusions.

The guide member may further include a sealing protrusion protruding from an inner surface of the connection flange toward the lower port to prevent leakage between the lower port and the guide member.

The guide member may further include a sealing protrusion protruding from an outer surface of the connection pipe toward the lower port to prevent leakage between the lower port and the guide member.

The guide member may have a curved shape configured to reduce a pressure loss of the wash water guided from the pump to the distribution chamber.

The guide member may include silicon or an ethylene propylene diene monomer (EPDM) material.

In accordance with another aspect of the disclosure a dishwasher includes a tub, a spray unit configured to spray wash water into the tub, a sump housing including a water storage chamber provided to store wash water of the tub, a distribution chamber provided to receive wash water supplied to the spray unit, and a lower port formed in the distribution chamber and provided to allow wash water to flow in and out, a sump cover provided to cover an upper portion of the sump housing, and including an upper port connected to the spray unit, a guide member connected to the lower port so as to guide wash water introduced into the distribution chamber or to guide wash water discharged from the distribution chamber, and a support provided to support the guide member and the lower port, from a lower side of the distribution chamber.

The support may further include a coupler protruding toward the guide member so as to be coupled to the guide member.

The guide member may further include a coupling protrusion hole provided to be inserted into the coupler.

The guide member may be coupled to the coupler by being rotated in a direction, and released from the coupler by being rotated in a direction opposite to the one direction.

The guide member may further include a fixing rib provided to interfere with the support so as to limit the rotation in the one direction.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
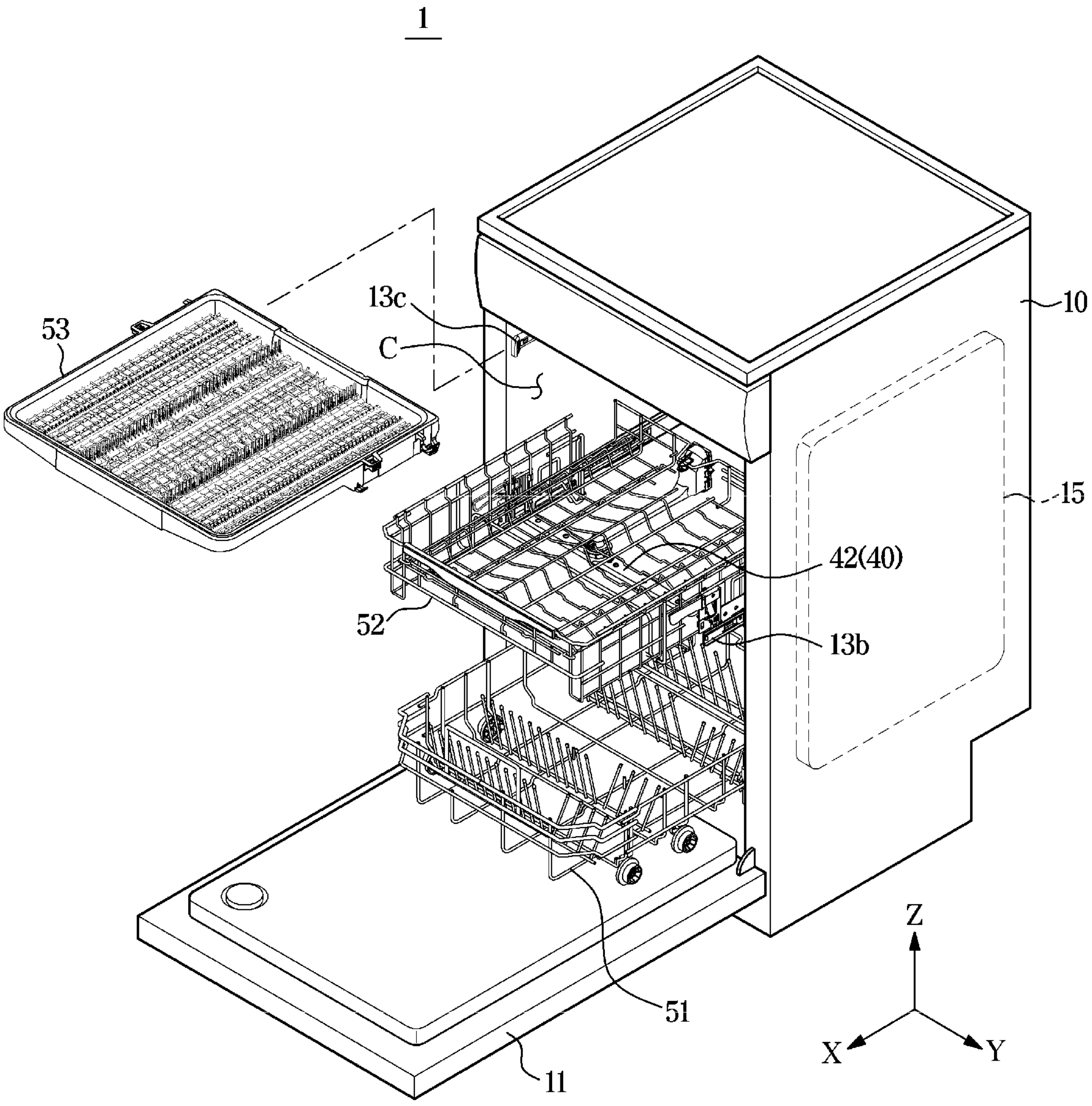
FIG. 1 is a schematic perspective view of a dishwasher according to an embodiment of the disclosure.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that when an element is referred to as being "connected" another element, it can be directly or indirectly connected to the other element. Similarly, it will be understood that when an element is referred to as being "coupled" another element, it can be directly or indirectly coupled to the other element.

Throughout the description, when a member is located "on" another member, this includes not only when the member is in contact with the other member, but also when there is another member between the two members.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Meanwhile, the terms "up and down direction", "height direction", "vertical direction", "horizontal direction", "upper direction", "lower direction", and "front and rear direction" used in the following description are defined based on the drawings, but the shape and position of each component are not limited by this term.

Figure 2:
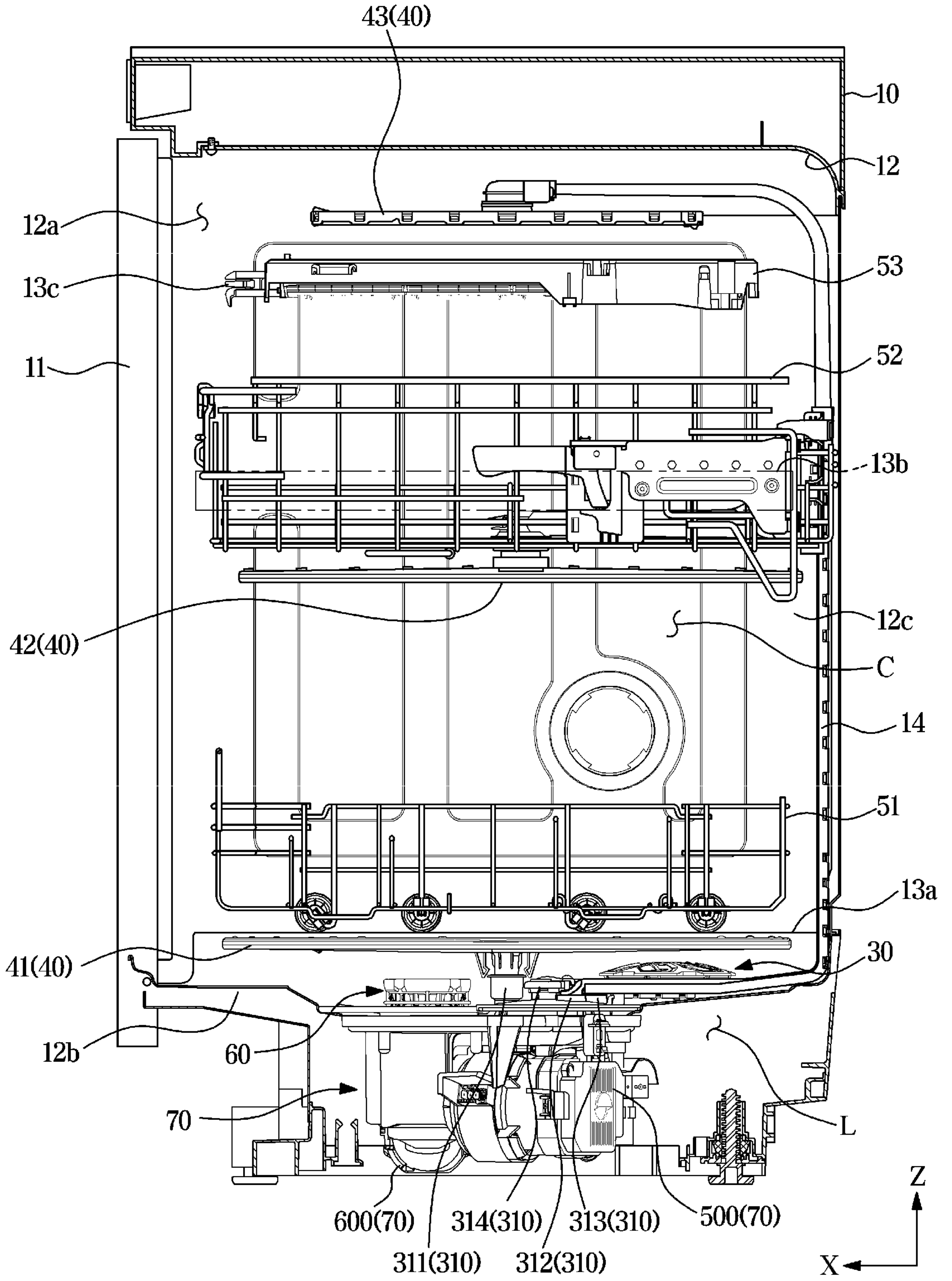
FIG. 2 is a schematic side cross-sectional view of the dishwasher according to an embodiment of the disclosure.

For example, referring to FIGS. 1 and 2, "up and down direction", "height direction", and "vertical direction" may mean the Z direction. "Horizontal direction" may mean any direction along the X-Y plane. However, the above description is merely illustrative, and is not limited thereto.

Embodiments of the disclosure may provide a dishwasher including an improved structure. Embodiments of the disclosure may provide a dishwasher including a compact structure. Embodiments of the disclosure may provide a dishwasher including a support on which a guide member is easily mounted. Embodiments of the disclosure may provide a dishwasher capable of easily coupling a connector to a sump housing without a separate process and/or a separate member. Embodiments of the disclosure may provide a dishwasher capable of easily coupling a valve assembly to a sump housing without a separate member.

Hereinafter an embodiment according to the disclosure will be described in detail with reference to the accompanying drawings.

FIG. 1 is a schematic perspective view of a dishwasher according to an embodiment of the disclosure. FIG. 2 is a schematic side cross-sectional view of the dishwasher according to an embodiment of the disclosure.

Referring to FIGS. 1 and 2, a dishwasher 1 may include a main body 10. The main body 10 may form an exterior of the dishwasher 1.

The dishwasher 1 may include a tub 12 arranged inside the main body 10. The tub 12 may be formed in a substantially box shape. One side of the tub 12 may be openable. That is, the tub 12 may include an opening 12*a*. For example, a front surface of the tub 12 may be openable.

The dishwasher 1 may include a door 11 configured to open and close the opening 12*a* of the tub 12. The door 11 may be installed in the main body 10 to open and close the opening 12*a* of the tub 12. The door 11 may be rotatably installed in the main body 10. The door 11 may be removably mounted to the main body 10.

The dishwasher 1 may include a water tank 15 provided to store wash water. For example, the water tank 15 may be arranged between the main body 10 and the tub 12. However, it is not limited thereto, and the water tank 15 may be provided inside the tub 12 or outside the main body 10. Details of the water tank 15 will be described later.

The dishwasher 1 may further include a storage container arranged in the tub 12 to accommodate dishes.

The storage container may include a plurality of baskets 51, 52 and 53. The plurality of baskets 51, 52, and 53 may be provided to store various tableware. However, it is not limited thereto, and the storage container may include a single basket.

The storage container may include an intermediate basket 52 positioned in the middle with respect to the height direction of the dishwasher 1, and a lower basket 51 positioned in a lower portion with respect to the height direction of the dishwasher 1. The intermediate basket 52 may be provided to be supported by an intermediate guide rack 13*b*. The lower basket 51 may be provided to be supported by a lower guide rack 13*a*. The intermediate guide rack 13*b* and the lower guide rack 13*a* may be installed on a side surface 12*c* of the tub 12 so as to be slidable toward the opening 12*a* of the tub 12. The side surface 12*c* of the tub 12 may include an inner surface of a right wall and/or an inner surface of a left wall of the tub 12.

Relatively large dishes may be stored in the plurality of baskets 51 and 52. However, the kind of dishes accommodated in the plurality of baskets 51 and 52 is not limited to relatively large dishes. That is, the plurality of baskets 51 and 52 may accommodate not only relatively large dishes but also relatively small dishes.

The storage container may include an upper basket 53 positioned in an upper portion with respect to the height direction of the dishwasher 1. The upper basket 53 may be formed in a rack assembly to accommodate relatively small dishes. For example, the upper basket 53 may contain a cooking utensil such as a ladle, a knife, or a turner, or cutlery. In addition, the upper basket 53 may accommodate a small cup such as an espresso cup. However, the kind of dishes accommodated in the upper basket 53 is not limited thereto.

The upper basket 53 may be provided to be supported by an upper guide rack 13*c*. The upper guide rack 13*c* may be installed on the side surface 12*c* of the tub 12. For example, the upper basket 53 may be slidably moved by the upper guide rack 13*c*, and inserted into or withdrawn from a washing chamber C.

The dishwasher 1 may include the washing chamber C, which is a space formed inside the tub 12. The washing chamber C may be defined as an inner space of the tub 12. The washing chamber C may refer to a space in which dishes placed in the storage container may be washed by wash water and dried.

The dishwasher 1 may include a spray device 40 configured to spray wash water. The spray device 40 may spray wash water into the washing chamber C. The spray device 40 may spray the wash water toward the dishes stored in the storage container. The spray device 40 may receive wash water from a sump assembly 70 to be described later. The spray device 40 may be a concept including an auxiliary spray device 30 to be described later.

The spray device 40 may include at least one spray unit. The spray device 40 may include a single spray unit or a plurality of spray units 41, 42, and 43.

For example, the plurality of spray units 41, 42, and 43 may include a first spray unit 41 arranged under the lower basket 51 in the height direction of the dishwasher 1, a second spray unit 42 arranged under the intermediate basket 52 in the height direction of the dishwasher 1 and a third spray unit 43 arranged above the upper basket 53 in the height direction of the dishwasher 1. However, it is not limited thereto, and two or four or more of spray units may be provided.

Each of the plurality of spray units 41, 42, and 43 may be provided to spray wash water while rotating. Each of the first spray unit 41, the second spray unit 42, and the third spray unit 43 may be provided to spray wash water while rotating. The plurality of spray units 41, 42 and 43 may be referred to as a plurality of spray rotors. The first spray unit 41, the second spray unit 42, and the third spray unit 43, respectively, may be referred to as a first spray rotor 41, a second spray rotor 42, and a third spray rotor 43.

However, the spray device 40 may spray the wash water in a manner different from the above-described example. For example, unlike the second spray unit 42 and the third spray unit 43, the first spray unit 41 may be fixed to one side of a lower surface 12*b* of the tub 12. At this time, the first spray unit 41 may be provided to spray the wash water in a substantially horizontal direction by a fixed nozzle, and a direction of the wash water, which is sprayed in a substantially horizontal direction from the nozzle of the first spray unit 41, may be changed by a conversion assembly (not shown) arranged thereon, and then move upward. The conversion assembly may be installed on a rail (not shown) and may be provided to be movable in translation along the rail. Meanwhile, although the first spray unit 41 is described as an example, the second spray unit 42 and the third spray unit 43 may also be provided to spray wash water using fixed nozzles, similar to the above-described example.

The dishwasher 1 may include an auxiliary spray device 30. The auxiliary spray device 30 may be arranged at one side of a lower portion of the washing chamber C to spray wash water to a partial region of the washing chamber C. The auxiliary spray device 30 may be designed to spray relatively high-pressure water compared to the spray device 40, and the auxiliary spray device 30 may intensively wash heavily soiled dishes. The auxiliary spray device 30 may be referred to as an auxiliary spray unit 30. The auxiliary spray device 30 may be provided as one component of the spray device 40. The auxiliary spray device 30 may be omitted.

The dishwasher 1 may include a sump assembly 70.

The sump assembly 70 may be provided to receive wash water. The sump assembly 70 may collect wash water of the washing chamber C. For example, the lower surface 12*b* of the tub 12 may be inclined downward toward the sump assembly 70 to smoothly collect water to the sump assembly 70. The wash water of the washing chamber C may flow along the slope of the lower surface 12*b* of the tub 12 and smoothly flow into the sump assembly 70.

The dishwasher 1 may include a circulation pump 500 configured to pump wash water stored in the sump assembly 70 to the spray device 40. The circulation pump 500 may be provided as one component of the sump assembly 70. The circulation pump 500 may be arranged in a machine room L.

The dishwasher 1 may include a drain pump 600 configured to drain wash water and foreign substances (e.g., food residues) remaining in the sump assembly 70. The drain pump 600 may be provided as one component of the sump assembly 70. The drain pump 600 may be arranged in the machine room L. The sump assembly 70 may pump the collected wash water and supply the wash water to the spray device 40. The sump assembly 70 may pump the collected wash water and supply the wash water to the auxiliary spray device 30. The sump assembly 70 may include a connection port 310 connected to the spray device 40 to supply wash water to the spray device 40 and/or the auxiliary spray device 30. For example, the connection port 310 may be formed in a sump cover 300 (refer to FIGS. 3 and 4) to be described later.

For example, referring to FIG. 2, the connection port 310 may include a first connection port 311 connected to the first spray unit 41, a second connection port 312 connected to the second spray unit 42, and a third connection port 313 connected to the third spray unit 43. The second connection port 312 may be connected to the second spray unit 42 through a first duct. The third connection port 313 may be connected to the third spray unit 43 through a second duct. The first duct and the second duct may be provided as separate ducts or as a single duct 14 as shown in FIG. 2. The duct 14 may include a shape extending in the height direction.

For example, the connection port 310 may include a fourth connection port 314 connected to the auxiliary spray device 30.

The dishwasher 1 may include a filter assembly 60. The filter assembly 60 may be provided to filter out foreign substances included in the wash water flowing into the sump assembly 70. The filter assembly 60 may be detachably mounted on a sump housing 100. At least a portion of the filter assembly 60 may be arranged inside a water storage chamber 111 to be described later. For example, the filter assembly 60 may include at least one of a fine filter, a coarse filter, and a micro filter.

Wash water filtered through the filter assembly 60 may be pumped by the circulation pump 500 and supplied to the spray device 40. As a result, clean wash water, from which foreign substances are removed, may be sprayed into the washing chamber C through the spray device 40.

The dishwasher 1 may include the machine room L, which is a space provided below the tub 12. The machine room L may be a place in which a component for circulating wash water is arranged.

For example, at least a part of the sump assembly 70 may be arranged in the machine room L. Most of the sump assembly 70 may be arranged in the machine room L. That is, an area of the sump assembly 70 located in the washing chamber C may be less than an area of the sump assembly 70 located in the machine room L. By reducing the area of the sump assembly 70 occupying the washing chamber C, the area of the washing chamber C may be secured. Accordingly, a capacity of the washing chamber C may be increased, and thus a storage capacity of the dishes may be improved.

Figure 3:
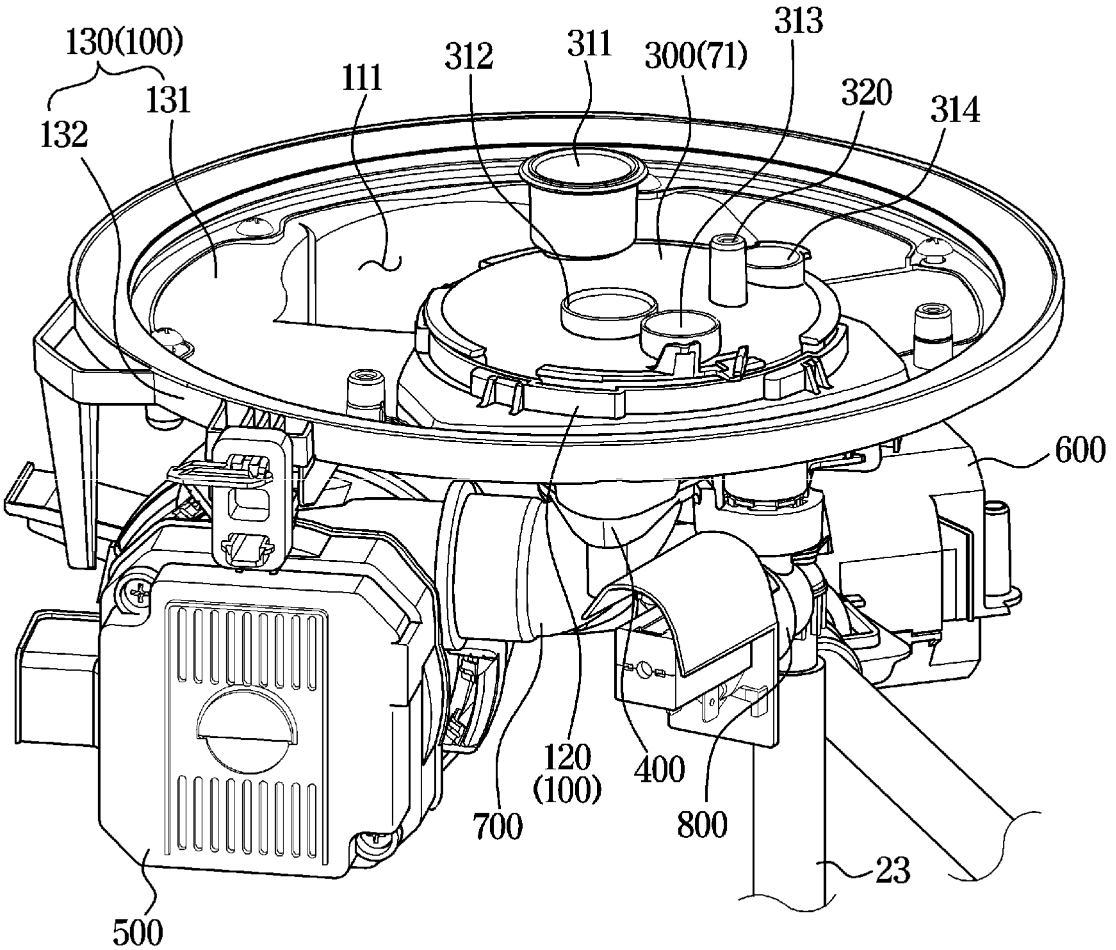
FIG. 3 is a perspective view of a sump assembly of the dishwasher according to an embodiment of the disclosure.
Figure 4:
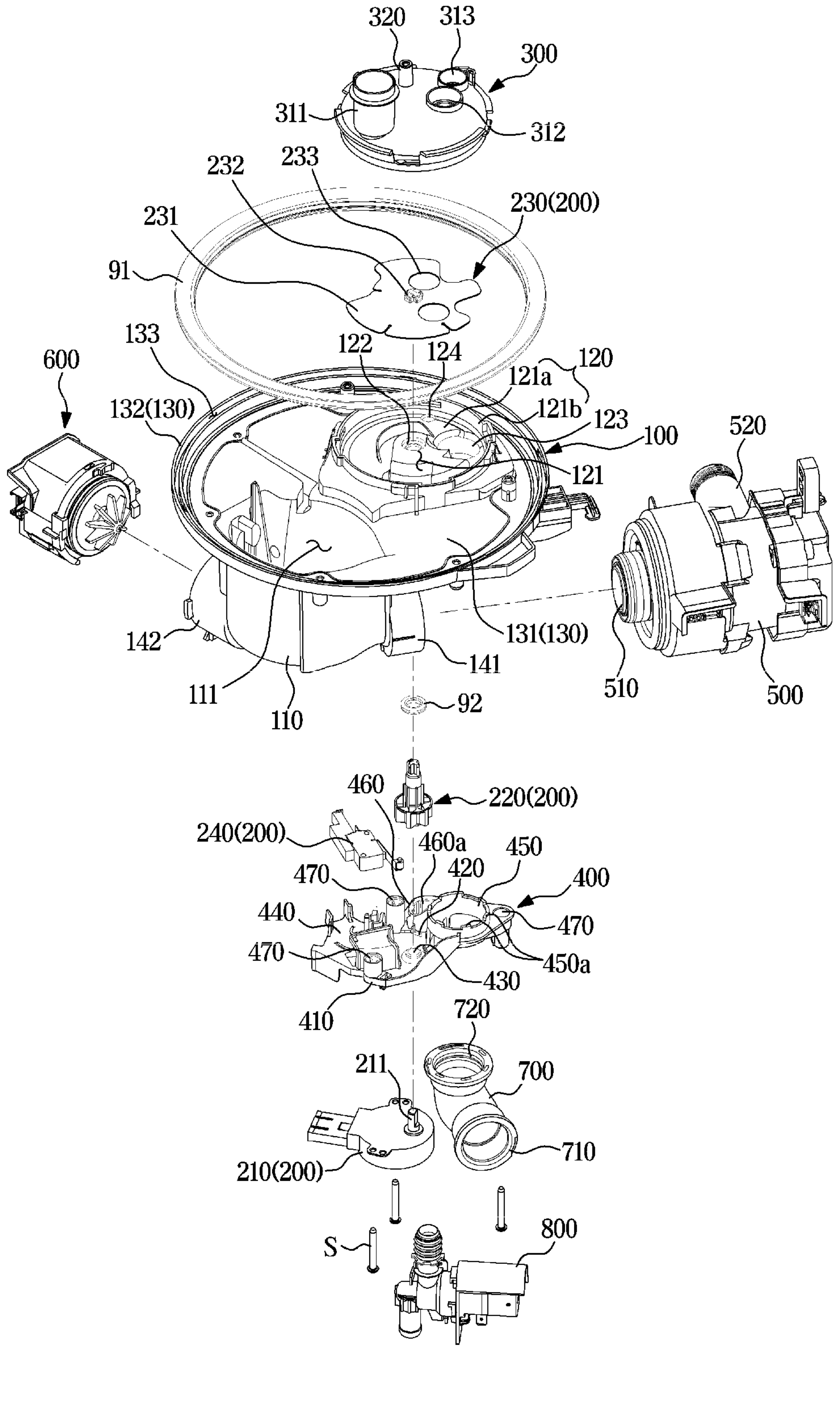
FIG. 4 is an exploded view of the sump assembly of the dishwasher according to an embodiment of the disclosure.

FIG. 3 is a perspective view of a sump assembly of the dishwasher according to an embodiment of the disclosure. FIG. 4 is an exploded view of the sump assembly of the dishwasher according to an embodiment of the disclosure.

Referring to FIGS. 3 and 4, the sump assembly 70 may include a sump body 71. The sump body 71 may form an exterior of the sump assembly 70. Components for collecting, circulating, and supplying wash water may be detachably mounted on the sump body 71.

For example, the sump body 71 may include the sump housing 100 and the sump cover 300. Although the sump housing 100 and the sump cover 300 are shown as separate components in the drawing, it is not limited thereto and the sump housing 100 and the sump cover 300 may be integrally formed.

The sump housing 100 may be provided to accommodate wash water.

The sump housing 100 may include the water storage chamber 111 provided to store wash water. The water storage chamber 111 may have an open top shape. The water storage chamber 111 may have a downwardly recessed shape. For example, the water storage chamber 111 may be provided to receive wash water introduced from a water supply pipe 21 through a water supply hole 170 or to receive wash water introduced from the tub 12.

The sump housing 100 may include a distribution chamber 121 in which wash water supplied to the spray device 40 is accommodated. The distribution chamber 121 may be provided to accommodate the wash water supplied to the spray unit. The distribution chamber 121 may be partitioned from the water storage chamber 111. The distribution chamber 121 may receive the wash water stored in the water storage chamber 111.

The distribution chamber 121 may be defined by a chamber bottom 121*a* and a chamber sidewall 121*b* provided to surround an edge of the chamber bottom 121*a*. The distribution chamber 121 may be formed by the chamber bottom 121*a* and the chamber sidewall 121*b*.

For example, the distribution chamber 121 may be provided in a shape raised from the sump housing 100. As a result, an amount of water filled in the distribution chamber 121 may be reduced. For example, wash water may naturally flow into the water storage chamber 111 having a recessed shape. It may be difficult for wash water to flow into the distribution chamber 121 having a raised shape. As a result, the amount of water used by the dishwasher 1 may be reduced.

The distribution chamber 121 may be provided as one component of a distribution device 200 to be described later.

Meanwhile, although the water storage chamber 111 and the distribution chamber 121 are shown as integrally formed in the drawings, it is not limited thereto. Alternatively, the water storage chamber 111 and the distribution chamber 121 may be provided as separate components.

For example, the sump housing 100 may include a first sump body 110 provided to form the water storage chamber 111 and a second sump body 120 provided to form the distribution chamber 121.

For example, the sump housing 100 may include the third sump body 130. The third sump body 130 may refer to an exterior of the sump housing 100 excluding the first sump body 110 and the second sump body 120.

For example, the third sump body 130 may include a base 131 connecting the first sump body 110 and the second sump body 120. The third sump body 130 may include an edge 132 protruding upward from an outer edge of the base 131. However, the shape of the third sump body 130 is not limited to the above example and may include various shapes.

Components communicating with the water storage chamber 111 (e.g., the circulation pump 500 and the drainage pump 600, etc.) may be detachably mounted on the first sump body 110.

Components communicating with the distribution chamber 121 (e.g., the distribution device 200, a connector 700, a valve assembly 800, etc., which will be described later) may be detachably mounted on the second sump body 120.

The second sump body 120 may include a chamber hole 122 communicating with the distribution chamber 121. A portion of a connection shaft 220 of the distribution device 200 to be described later may be inserted into the chamber hole 122 and protrude into the distribution chamber 121. The chamber hole 122 may be provided at the center of the distribution chamber 121.

Figure 9:
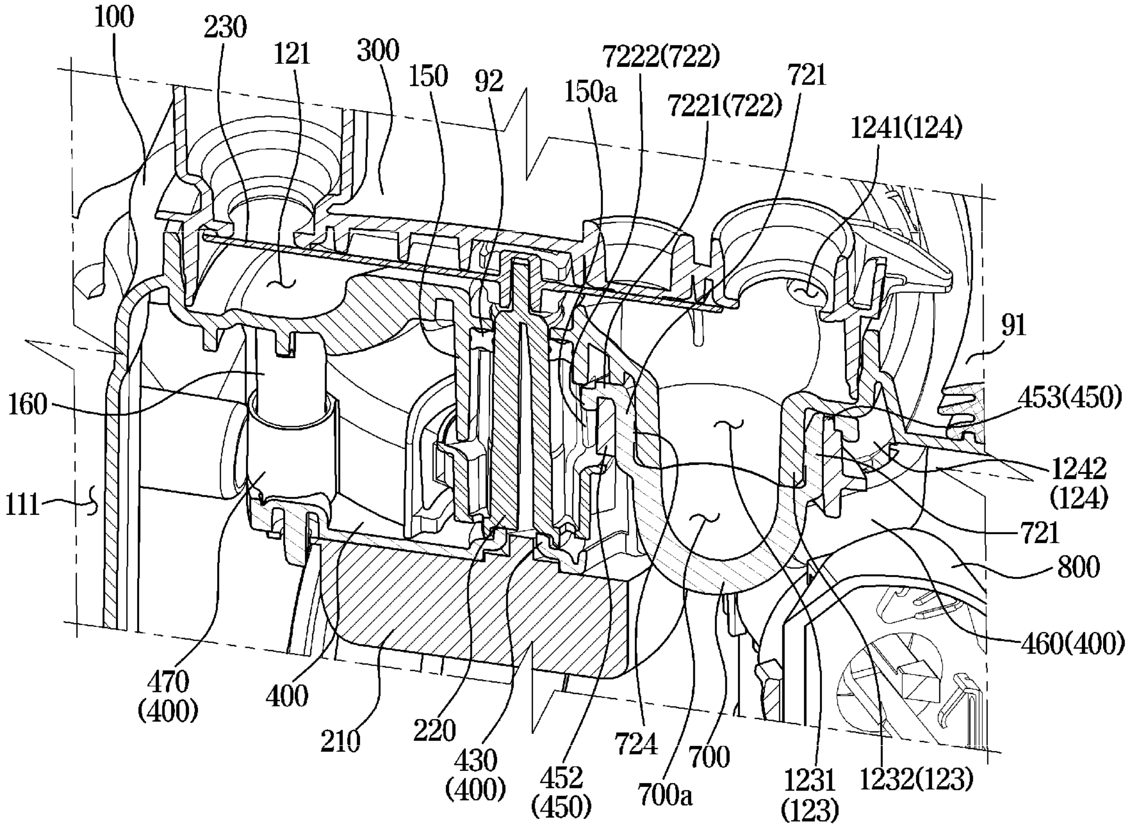
FIG. 9 is a perspective view illustrating a state in which the sump assembly of the dishwasher according to an embodiment of the disclosure is taken along a line.
Figure 10:
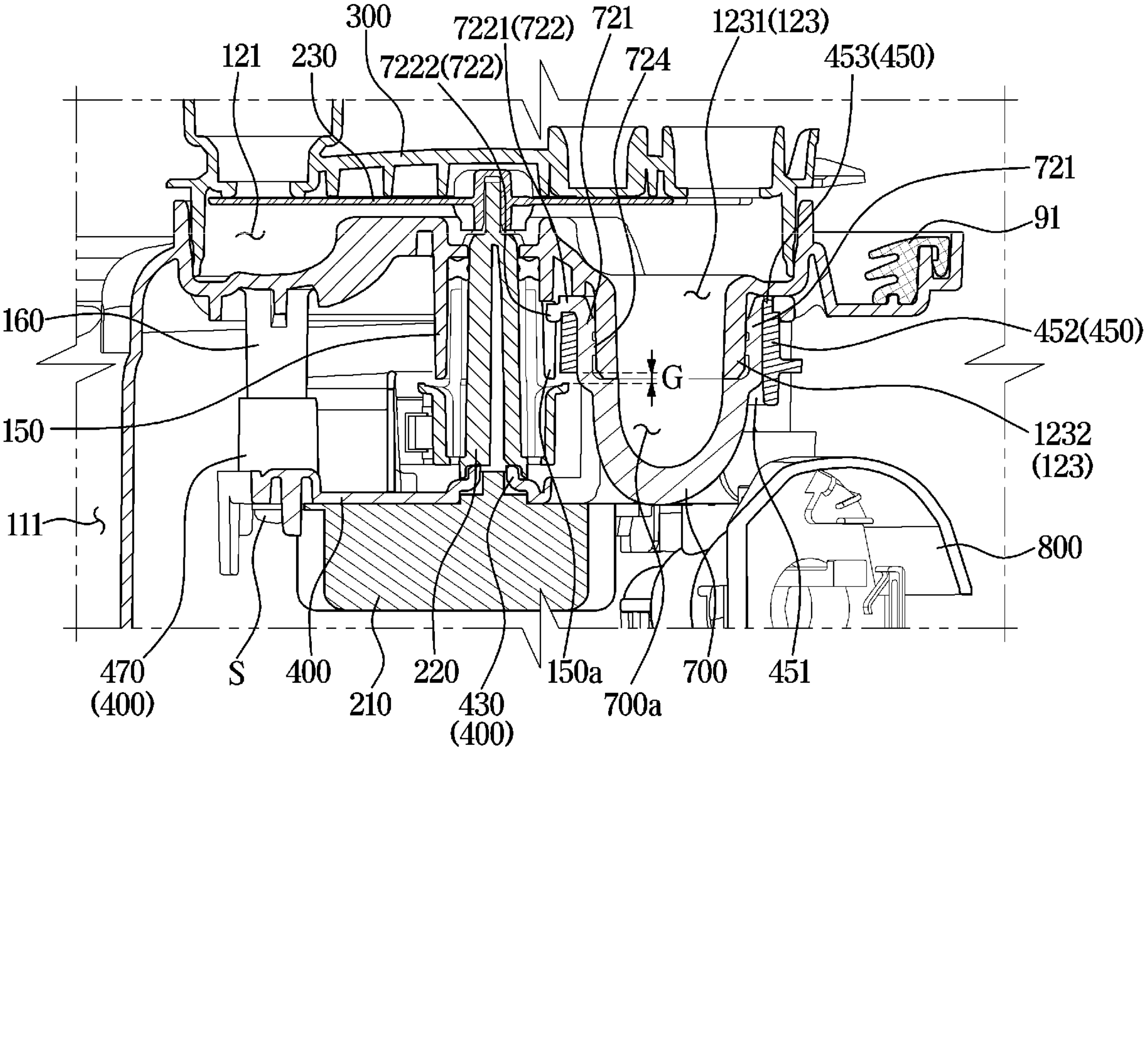
FIG. 10 is a partial cross-sectional view of the sump assembly shown in FIG. 9 according to an embodiment of the disclosure.

The second sump body 120 may include a shaft flange 150 corresponding to the chamber hole 122 and extending downward (refer to FIGS. 9 and 10). The shaft flange 150 may include a cutout 150*a*. The cutout 150*a* may be provided to prevent interference with the connector 700.

The sump housing 100 may include at least one port 123 or 124 through which wash water flows in and out. The sump housing 100 may include at least one port 123 or 124 provided to communicate with the distribution chamber 121 so as to allow the wash water to flow. The distribution chamber 121 may include at least one port 123 or 124. At least one port 123 or 124 may be formed in the chamber bottom 121*a* of the distribution chamber 121.

The ports 123 and 124 may include at least one of an inlet port 123 and an outlet port 124 to be described later. The ports 123 and 124 may include the inlet port 123. The ports 123 and 124 may include the outlet port 124. The ports 123 and 124 may include the inlet port 123 and the outlet port 124.

The ports 123 and 124 may be referred to as lower ports 123 and 124. The inlet port 123 may be referred to as a lower port 123. The outlet port 124 may be referred to as a lower port 124. For example, the inlet port 123 may be referred to as a first lower port 123. For example, outlet port 124 may be referred to as a second lower port 124.

The second sump body 120 may include the inlet port 123 through which wash water flows into the distribution chamber 121. The inlet port 123 may be connected to a guide member to be described later. For example, the inlet port 123 may be connected to the connector 700.

The second sump body 120 may include the outlet port 124 through which wash water in the distribution chamber 121 flows out. The outlet port 124 may be connected to a guide member to be described later. For example, the outlet port 124 may be connected to the valve assembly 800.

The sump housing 100 may include a support coupler 160 (refer to FIGS. 9 and 10). The sump housing 100 may include the support coupler 160 to which a support 400 to be described later is detachably coupled. For example, the support coupler 160 of the sump housing 100 may be coupled to a sump coupler 470 of the support 400. The support coupler 160 of the sump housing 100 may be fastened to the sump coupler 470 by a screw S. However, it is not limited thereto, and various coupling methods may be applied. It is illustrated that three support couplers 160 are provided in the drawings, but it is not limited thereto. Alternatively, two or less or four or more of the support couplers 160 may be provided. For example, the support coupler 160 may be formed on the second sump body 120.

The sump cover 300 may be provided to cover at least a portion of the sump housing 100. The sump cover 300 may be provided to cover an upper portion of the distribution chamber 121.

The sump cover 300 may be detachably coupled to the sump housing 100. The sump cover 300 may be rotatably coupled to the sump housing 100. For example, the sump cover 300 may be fixed to the second sump body 120 as the sump cover 300 rotates.

The sump cover 300 may be provided as one component of the distribution device 200 to be described later. The sump cover 300 may be referred to as a distribution cover 300.

The sump cover 300 is illustrated as having a circular shape in the drawings, but it is not limited thereto. Alternatively, the sump cover 300 may have a polygonal shape.

The sump cover 300 may include the connection port 310. The connection port 310 may be connected to the spray device 40. The connection port 310 may be connected to at least one of the plurality of spray units 41, 42, 43, and 30. For example, the connection port 310 may be connected to at least one of the plurality of spray units 41, 42, 43, and 30 through the duct 14. Wash water in the distribution chamber 121 may flow to the plurality of spray units 41, 42, 43, and 30 through the connection port 310.

For example, the connection port 310 may include at least one of the first connection port 311, the second connection port 312, the third connection port 313, and the fourth connection port 314.

The connection port 310 may be referred to as an upper port 310.

The sump cover 300 may include a fixer 320. For example, the fixer 320 may be provided to fix the auxiliary spray device 30 and/or the duct 14.

The sump assembly 70 may include the distribution device 200.

The distribution device 200 may supply the wash water accommodated in the distribution chamber 121 to the spray device 40. The distribution device 200 may supply wash water to at least one of the plurality of spray units 41, 42, 43, and 30. The distribution device 200 may allow wash water to be selectively sprayed from the plurality of spray units 41, 42, 43, and 30. The distribution device 200 may reduce the amount of water used by the dishwasher 1.

The distribution device 200 may include a distribution motor 210. The distribution device 200 may include the connection shaft 220. The distribution device 200 may include a distribution disk 230.

The distribution motor 210 may generate a rotational force to rotate the distribution disk 230.

The connection shaft 220 may connect the distribution motor 210 and the distribution disk 230. For example, the connection shaft 220 may have a shape extending in the up and down direction. For example, one end of the connection shaft 220 may be coupled to a motor shaft 211 of the distribution motor 210 and the other end of the connection shaft 220 may be coupled to the distribution disk 230.

The connection shaft 220 may transfer the rotational force generated by the distribution motor 210 to the distribution disk 230. The connection shaft 220 may rotate together with the distribution motor 210 in association with rotation of the distribution motor 210.

The connection shaft 220 may be arranged coaxially with a rotation axis of the distribution motor 210. The connection shaft 220 may be arranged coaxially with a rotation axis of the distribution disk 230.

The distribution disk 230 may be arranged in the distribution chamber 121. The distribution disk 230 may be provided to rotate by receiving the rotational force of the distribution motor 210. While the distribution disk 230 rotates, the distribution disk 230 may selectively open and close the plurality of connection ports 311, 312, 313, and 314 connected to each of the plurality of spray units 41, 42, 43, and 30. Thus, the wash water in the distribution chamber 121 may be selectively supplied to the plurality of spray units 41, 42, 43, and 30.

For example, the distribution disk 230 may include a disk body 231, a shaft coupler 232, and a communication hole 233.

The disk body 231 may form an exterior of the distribution disk 230. For example, the disk body 231 may have a substantially plate shape.

The shaft coupler 232 may be detachably coupled to the connection shaft 220. The shaft coupler 232 may form the rotation axis of the distribution disk 230. For example, the shaft coupler 232 may be formed at the center of the disk body 231. For example, the shaft coupler 232 may be arranged at the center of the distribution chamber 121.

The communication hole 233 may be formed to penetrate the disk body 231. As the distribution disk 230 rotates, the communication hole 233 may communicate with at least one of the plurality of connection ports 311, 312, 313, and 314. Wash water in the distribution chamber 121 may flow into the spray unit connected to the corresponding connection port 310 through the connection port 310 communicating with the communication hole 233.

The distribution device 200 may include a switch 240 configured to detect a rotational position of the connection shaft 220. For example, the switch 240 may detect an ON or OFF signal depending on whether or not the switch 240 is in contact with the connection shaft 220.

The distribution chamber 121 may be provided as one component of the distribution device 200. The sump cover 300 may be provided as one component of the distribution device 200.

The sump assembly 70 may include the support 400.

The support 400 may be provided to hold some components of the sump assembly 70. The support 400 may be provided to allow some components of the sump assembly 70 to be detachably mounted. The support 400 may allow some components of the sump assembly 70 to be compactly arranged, and accordingly, the size of the sump assembly 70 may be reduced.

The support 400 may be provided to hold a guide member for guiding the wash water. The support 400 may be provided to support the guide member. The support 400 may support the guide member to allow the guide member to be connected to the distribution chamber 121. The support 400 may be arranged below the distribution chamber 121.

The guide member may be connected to the ports 123 and 124 to guide the wash water. For example, the guide member may guide wash water flowing into the distribution chamber 121 or wash water flowing out of the distribution chamber 121. The guide member may include at least one of the distribution device 200, the connector 700 and the valve assembly 800. For example, the guide member may be connected to the ports 123 and 124 so as to communicate with the distribution chamber 121.

The support 400 may include a holder to hold the guide member. The holder may be provided to mount one side of the guide member. For example, the holder may have a hollow shape.

For example, the holder of the support 400 may include at least one of a shaft holder 430, a switch holder 440, a connector holder 450, or a valve holder 460 to be described later. For example, the support 400 may be provided to support the distribution device 200, the connector 700, and the valve assembly 800 through the holder. A detailed description thereof will be described later.

The support 400 may include a coupler provided to fix the guide member to allow the guide member to correspond to the ports 123 and 124 through the holder. The coupler of the support 400 may be formed in the holder so as to be detachably coupled to the guide member. For example, the coupler of the support 400 may include at least one of a connector coupler **450*a* or a valve coupler 460*a***, which will be described later. A detailed description thereof will be described later.

The support 400 may be arranged below the sump housing 100. For example, the support 400 may be detachably coupled to a lower side of the sump housing 100 to correspond to the distribution chamber 121. The support 400 may be detachably mounted on a lower side of the second sump body 120.

For example, the support 400 may support the guide member from the lower side of the distribution chamber 121. The support 400 may be provided to support the ports 123 and 124 from the lower side of the distribution chamber 121. From the lower side the distribution chamber 121, the support 400 may support the guide member coupled to the ports 123 and 124. Thus, the guide member may be stably supported by the support 400 without a separate fixing member (e.g., a clamp). A detailed description thereof will be described later.

The support 400 may be provided to mount the distribution device 200.

The support 400 may be provided to mount the distribution motor 210. For example, the distribution motor 210, the support 400, and the sump housing 100 may be coupled by a separate fastening member. For example, the distribution motor 210, the sump coupler 470 of the support 400, and the support coupler 160 of the sump housing 100 may be fastened by a screw S, and accordingly, the distribution motor 210 may be fixed to the support 400. However, it is not limited thereto, and the distribution motor 210 may be seated on the support 400 without the screw S.

The support 400 may include a support body 410. The support body 410 may form an exterior of the support 400.

The support 400 may include the shaft holder 430 formed on the support body 410. For example, the shaft holder 430 may be formed to penetrate the support body 410. The motor shaft 211 of the distribution motor 210 may pass through the shaft holder 430 and be coupled to the connection shaft 220.

The support 400 may include the guide hole 420 provided to guide wash water, which leaks from the distribution chamber 121, to the outside of the distribution motor 210. The guide hole 420 may drain the wash water, which flows out from the distribution chamber 121, to the outside of the sump assembly 70. It is illustrated that the guide hole 420 is formed to penetrate the support body 410 in the drawing, but is not limited thereto. For example, the guide hole 420 may be recessed from the support body 410 and may also be referred to as a guide groove 420.

The support 400 may include the switch holder 440 on which the switch 240 is mounted. The switch 240 may be seated on the switch holder 440 so as to be in contact with the connection shaft 220.

The support 400 may include the connector holder 450 on which the connector 700 is mounted. The connector holder 450 may be provided to correspond to the inlet port 123. The connector 700 may be detachably mounted on the connector holder 450 and communicate with the inlet port 123 of the sump housing 100. The support 400 may include the connector coupler 450*a* detachably coupled to the connector 700. The connector holder 450 may include the connector coupler 450*a*. The connector coupler 450*a* may be formed in the connector holder 450. The connector coupler 450*a* may be provided as one component of the connector holder 450. A detailed description thereof will be described later.

For example, the connector holder 450 may be referred to as a first holder 450. For example, the connector coupler 450*a* may be referred to as a first coupler 450*a*.

The support 400 may include the valve holder 460 on which the valve assembly 800 is mounted. The valve holder 460 may be provided to correspond to the outlet port 124. The valve assembly 800 may be detachably mounted on the valve holder 460 and communicate with the outlet port 124 of the sump housing 100. The support 400 may include the valve coupler 460*a* detachably coupled to the valve assembly 800. The valve holder 460 may include the valve coupler 460*a*. The valve coupler 460*a* may be formed in the valve holder 460. The valve coupler 460*a* may be provided as one component of the valve holder 460. A detailed description thereof will be described later.

For example, the valve holder 460 may be referred to as a second holder 460. For example, the valve coupler 460*a* may be referred to as a second coupler 460*a*.

The support 400 may include the sump coupler 470 coupled to the sump housing 100. For example, the sump coupler 470 may correspond to the support coupler 160 of the sump housing 100. The sump coupler 470 may be fastened to the support coupler 160 by the screw S.

The sump assembly 70 may include the circulation pump 500. The circulation pump 500 may be configured to pump the wash water stored in the water storage chamber 111. The circulation pump 500 may be detachably mounted on a circulation pump connection member 141 of the sump housing 100. The circulation pump 500 may include an inlet member 510 through which the wash water flows from the water storage chamber 111, and an outlet member 520 through which the wash water introduced through the inlet member 510 is discharged. The inlet member 510 may be connected to the circulation pump connection member 141 and the outlet member 520 may be connected to the connector 700.

The sump assembly 70 may include the drain pump 600. The drain pump 600 may be configured to drain wash water and foreign substances remaining in the water storage chamber 111. The drain pump 600 may be detachably mounted on a drain pump connection member 142 of the sump housing 100.

The sump assembly 70 may include a guide member connected to the distribution chamber 121 and provided to guide the flow of wash water. For example, the guide member may include at least one of the distribution device 200, the connector 700, or the valve assembly 800.

The sump assembly 70 may include the connector 700. The connector 700 may connect the circulation pump 500 and the distribution chamber 121. A detailed description thereof will be described later.

The sump assembly 70 may include the valve assembly 800. The valve assembly 800 may connect the water tank 15 (refer to FIG. 1) and the distribution chamber 121. A detailed description thereof will be described later.

The sump assembly 70 may include a sealing member to reduce or prevent leakage of wash water.

For example, the sealing member may include a first sealing member 91 provided to seal between the tub 12 and the sump housing 100. The sealing member may be inserted into an insertion groove 133 formed in the edge 132 of the sump housing 100. The first sealing member 91 may have a ring shape.

For example, the sealing member may include a second sealing member 92 provided to seal between the sump housing 100 and the distribution device 200. The second sealing member 92 may be provided to seal between the shaft flange 150 and the connection shaft 220. The second sealing member 92 may have a ring shape.

Figure 5:
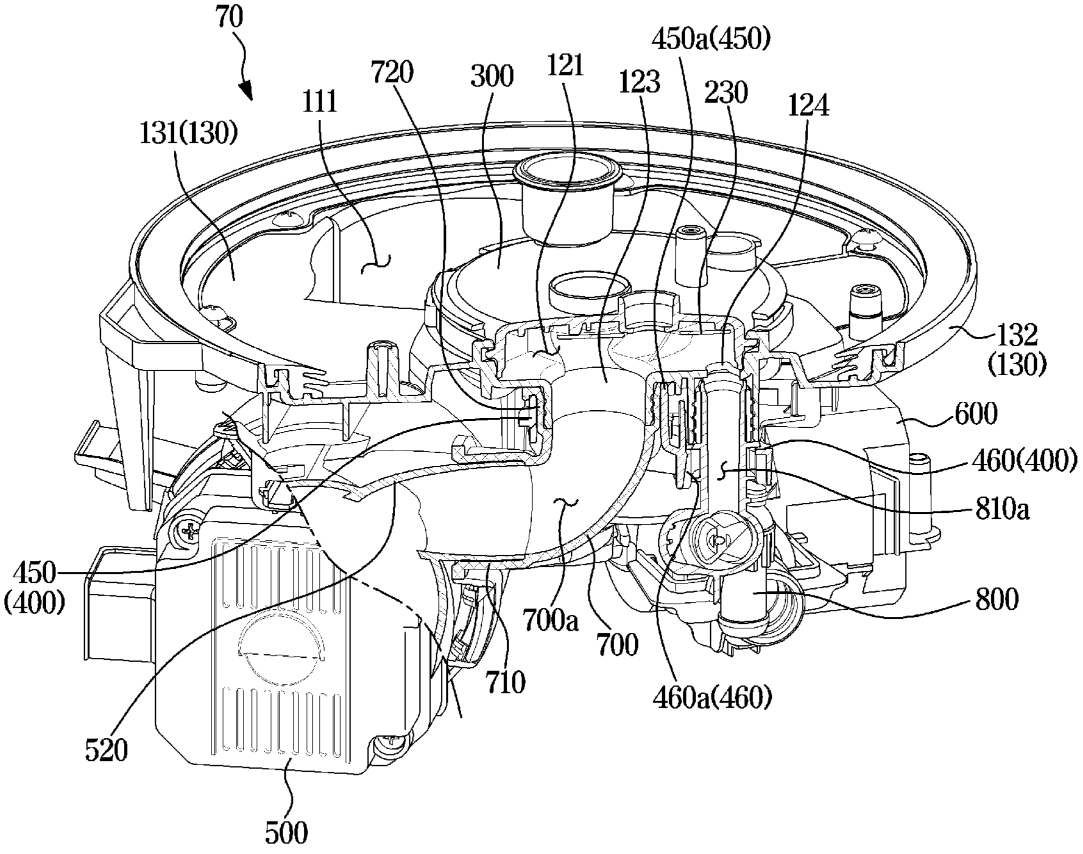
FIG. 5 is a perspective view illustrating a state in which the sump assembly of the dishwasher according to an embodiment of the disclosure is taken along a line.
Figure 6:
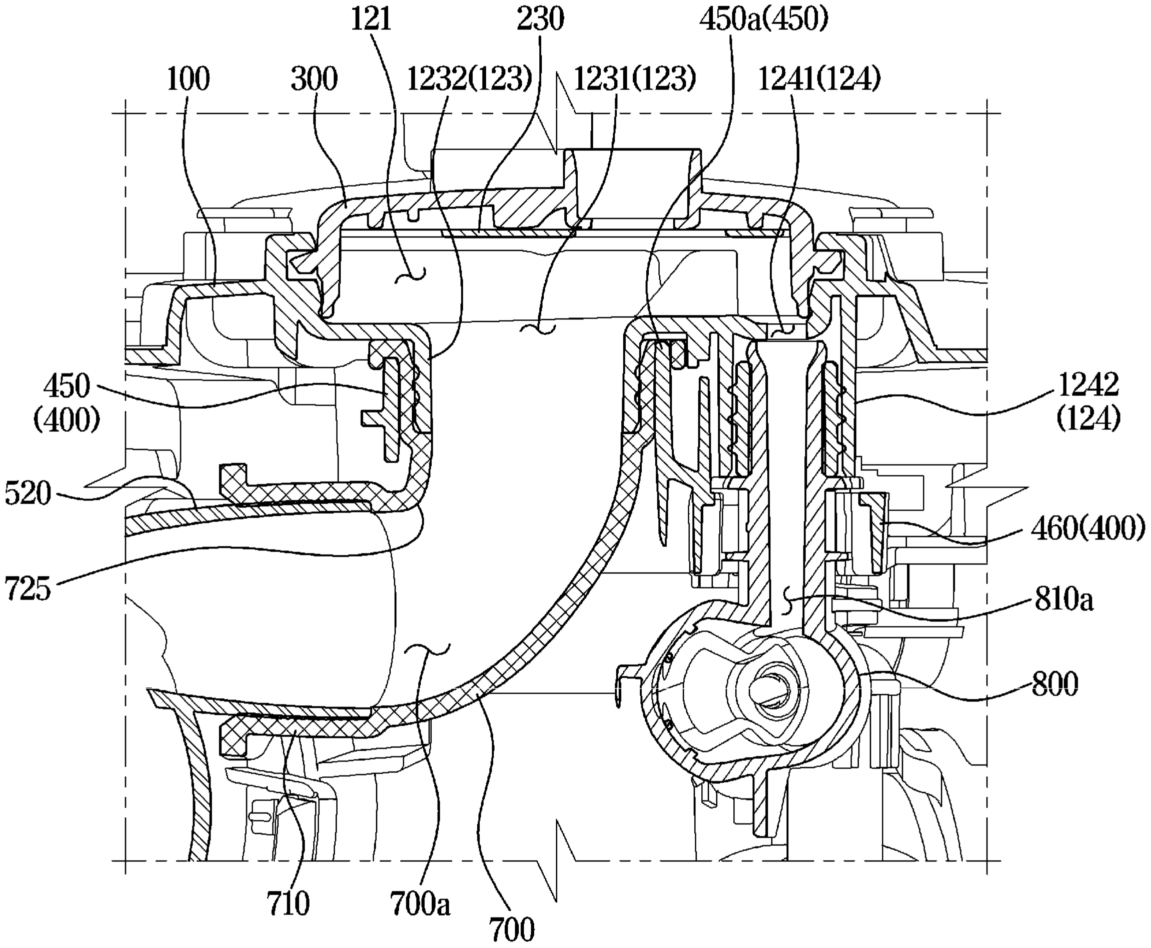
FIG. 6 is a partial cross-sectional view of the sump assembly shown in FIG. 5 according to an embodiment of the disclosure.

FIG. 5 is a perspective view illustrating a state in which the sump assembly of the dishwasher according to an embodiment is taken along a line. FIG. 6 is a partial cross-sectional view of the sump assembly shown in FIG. 5.

Referring to FIGS. 5 and 6, the connector 700 may connect the circulation pump 500 and the distribution device 200. The connector 700 may connect the circulation pump 500 and the distribution chamber 121. The connector 700 may guide wash water from the circulation pump 500 to the distribution chamber 121. One end 710 of the connector 700 may be connected to the outlet member 520 of the circulation pump 500, and another end 720 of the connector 700 may be connected to the inlet port 123 of the sump housing 100. The other end 720 of the connector 700 may communicate with the distribution chamber 121 through the inlet port 123.

The connector 700 may form an inlet flow path 700*a*. Wash water pumped by the circulation pump 500 may flow through the inlet flow path 700*a* and be introduced into the distribution chamber 121.

The connector 700 may be mounted on the support 400. The connector 700 may be stably supported by the support 400. The connector 700 may be coupled to the sump housing 100 in a state in which the connector 700 is coupled to the connector holder 450 of the support 400. The connector 700 may be fixed to the sump housing 100 by the support 400.

The connector 700 may be referred to as a guide member 700. For example, the connector 700 may be referred to as a first guide member 700.

The valve assembly 800 may connect the water tank 15 (refer to FIG. 1) and the distribution chamber 121. The valve assembly 800 may be configured to open and close a flow path between the water tank 15 and the distribution chamber 121.

For example, a part of the valve assembly 800 may be connected to the outlet port 124 of the sump housing 100, and another part of the valve assembly 800 may be connected to a return pipe 23 (refer to FIG. 3) connected to the water tank 15. One end of the return pipe 23 may be connected to the valve assembly 800 and the other end of the return pipe 23 may be connected to the water tank 15. However, it is not limited thereto, and the valve assembly 800 may be directly connected to the water tank 15 without the return pipe 23.

The valve assembly 800 may form an outlet flow path 810*a*. For example, wash water in the distribution chamber 121 may flow through the outlet flow path 810*a* and flow into the return pipe 23. Wash water flowing into the return pipe 23 may flow toward the water tank 15. As a result, wash water in the distribution chamber 121 may be stored in the water tank 15 via the valve assembly 800.

When the valve assembly 800 opens the flow path between the water tank 15 and the distribution chamber 121, the water in the distribution chamber 121 may flow into the water tank 15 through the return pipe 23 (refer to FIG. 3). When the valve assembly 800 closes the flow path between the water tank 15 and the distribution chamber 121, the water in the distribution chamber 121 may not flow into the water tank 15 through the return pipe 23.

For example, a dish washing cycle may include a pre-washing operation, a main washing operation, a rinsing operation, and a drying operation. In the pre-washing operation, wash water may be sprayed to remove food wastes of the dish without adding detergent. In the main washing operation, the wash water and detergent may be supplied to wash dishes. In the rinsing operation, wash water may be supplied to rinse the dishes. In the drying operation, the dishes may be dried.

For example, at the end of one cycle, the dishwasher 1 may not discharge relatively clean wash water, which is used in the rinsing operation, but store the relatively clean water in the water tank. When a new cycle starts, the dishwasher 1 may supply the water stored in the water tank 15 to the sump assembly 70 and reuse the water. By recycling the used water, the amount of water used by the dishwasher 1 may be reduced. In addition, when the water tank 15 is arranged inside the main body 10, a temperature of an indoor space may be reflected and a temperature of the water may be higher than that of water supplied from the outside. As a result, an amount of energy consumed for increasing the temperature of the wash water may be reduced.

The valve assembly 800 may be mounted on the support 400. The valve assembly 800 may be stably supported by the support 400. The valve assembly 800 may be coupled to the sump housing 100 while the valve assembly 800 is coupled to the valve holder 460 of the support 400. The valve assembly 800 may be fixed to the sump housing 100 by the support 400.

The valve assembly 800 may be referred to as a guide member 800. For example, the valve assembly 800 may be referred to as a second guide member 800.

Figure 7:
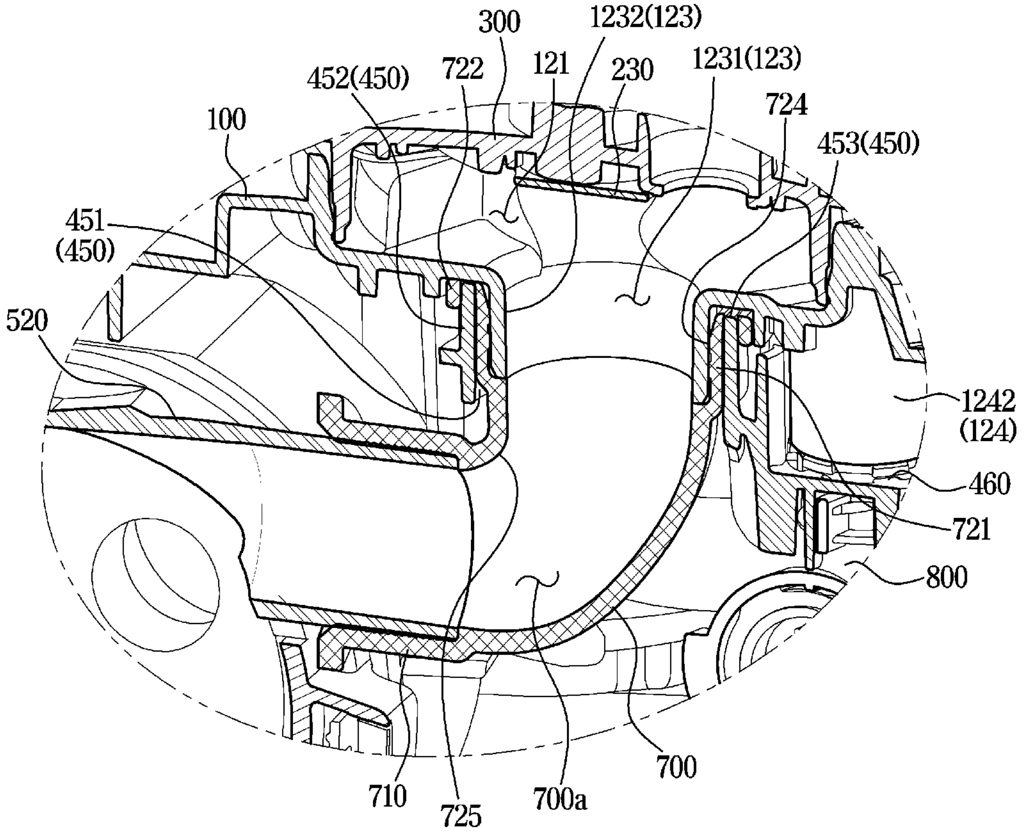
FIG. 7 is a perspective view illustrating a state in which the sump assembly of the dishwasher according to an embodiment of the disclosure is taken along a line.
Figure 8:
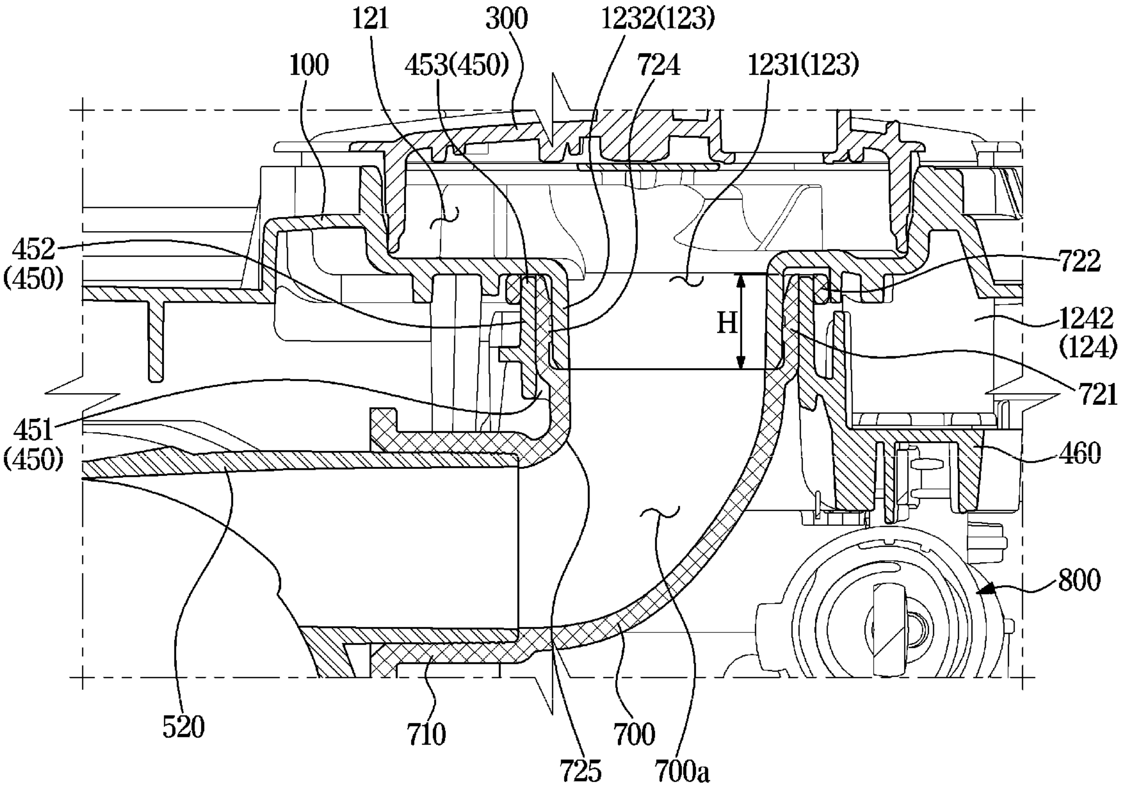
FIG. 8 is a partial cross-sectional view of the sump assembly shown in FIG. 7 according to an embodiment of the disclosure.

FIG. 7 is a perspective view illustrating a state in which the sump assembly of the dishwasher according to an embodiment is taken along a line. FIG. 8 is a partial cross-sectional view of the sump assembly shown in FIG. 7. FIG. 9 is a perspective view illustrating a state in which the sump assembly of the dishwasher according to an embodiment is taken along a line. FIG. 10 is a partial cross-sectional view of the sump assembly shown in FIG. 9.

Referring to FIGS. 7 to 10, the sump housing 100 may include the inlet port 123 into which wash water pumped by the circulation pump 500 is introduced. The inlet port 123 may be provided below the distribution chamber 121 and communicate with the distribution chamber 121.

The inlet port 123 may communicate with the distribution chamber 121 in a substantially vertical direction. For example, the inlet port 123 may be formed in the chamber bottom 121*a*. Accordingly, the wash water flowing into the distribution chamber 121 may be provided directly below the connection port 310 in the distribution chamber 121 and flow upward toward the connection port 310 by the rotation of the distribution disk 230. That is, because the inflow direction of the wash water and the distribution direction of the wash water are substantially the same, the flow loss of the wash water may be reduced and the wash water may flow smoothly.

For example, the inlet port 123 may include an inlet 1231 communicating with the distribution chamber 121. For example, the inlet port 123 may include an inlet flange 1232 corresponding to the inlet 1231 and extending downward from the distribution chamber 121.

For example, the inlet 1231 may have a circular shape, and the inlet flange 1232 may have a cylindrical shape surrounding a circumference of the inlet 1231. However, this is only exemplary, and is not limited thereto. For example, the inlet 1231 may have a polygonal shape, and the inlet flange 1232 may have a polygonal pillar shape.

The connector 700 may guide the wash water pumped by the circulation pump 500 to the distribution chamber 121.

The one end 710 of the connector 700 may be connected to the outlet member 520 of the circulation pump 500 and the other end 720 of the connector 700 may be connected to the inlet port 123.

The connector 700 may include a connection flange 721. The connection flange 721 may be provided at the other end 720 of the connector 700.

The connection flange 721 may be coupled to the inlet port 123. For example, the connection flange 721 may be coupled to an outer surface of the inlet port 123 to communicate with the distribution chamber 121. The connection flange 721 may be coupled to an outer surface of the inlet flange 1232 to communicate with the distribution chamber 121.

The connection flange 721 may communicate with the distribution chamber 121 in a substantially vertical direction. For example, the wash water passing through the inlet flow path 700*a* of the connector 700 may flow into the distribution chamber 121 in a substantially vertical direction through the inlet port 123, and the wash water flowing into the distribution chamber 121 may be transferred to the spray device 40 in a substantially vertical direction. Accordingly, the dishwasher 1 may implement an efficient flow path system.

The connector 700 may include an extension portion 722. The extension portion 722 may be provided at the other end 720 of the connector 700.

The extension portion 722 may extend from the connection flange 721 and be coupled to the support 400. The extension portion 722 may extend in a radial direction of the connection flange 721 and be provided to be locked to the support 400. That is, because the extension portion 722 is locked to the support 400, the connector 700 may be stably supported by the support 400. In addition, because the extension portion 722 is coupled to the sump housing 100 while the extension portion 722 is locked to the support 400, the connector 700 and the sump housing 100 may be more firmly coupled. However, it is not limited thereto, and the extension portion 722 may be provided to be locked to the sump housing 100 instead of the support 400. For example, the extension portion 722 may be provided to be locked to a protrusion (not shown) extending from the sump housing 100, and in this case, it is possible to omit the support 400.

The connector 700 may include a connector sealing protrusion 724.

The connector sealing protrusion 724 may be provided to prevent leakage between the sump housing 100 and the connector 700. The connector sealing protrusion 724 may protrude toward the sump housing 100 from an inner surface of the connection flange 721. The connector sealing protrusion 724 may protrude toward the inlet port 123 from the inner surface of the connection flange 721. The connector sealing protrusion 724 may protrude from the inner surface of the connecting flange 721 toward an outer surface of the inlet flange 1232. The connector sealing protrusion 724 may be in contact with the outer surface of the inlet flange 1232.

For example, the connector sealing protrusion 724 may include a plurality of sealing protrusions. The plurality of sealing protrusions may be spaced apart from each other in the up and down direction. However, it is not limited thereto, and the connector sealing protrusion 724 may be provided as a single sealing protrusion.

For example, the connector sealing protrusion 724 may include a ring shape extending along a circumferential direction of the connection flange 721. However, this is merely exemplary, and the shape of the connector sealing protrusion 724 is not limited as long as the connector sealing protrusion seals between the sump housing 100 and the connector 700.

Meanwhile, it is illustrated that the connector sealing protrusion 724 is integrally formed with the connection flange 721 in the drawings, but this is only exemplary. Alternatively, the connector sealing protrusion 724 and the connection flange 721 may be provided as separate components. In this case, the sealing protrusion 724 may be provided as a separate sealing member arranged on the inner surface of the connection flange 721.

The connector 700 may include a curved member 725 for smooth flow of wash water. The curved member 725 may be arranged between the one end 710 of the connector 700 and the other end 720 of the connector 700. The curved member 725 may prevent a reduction in the pressure of the wash water caused by a collision or the like while the wash water flows in the inlet flow path **700*a*. That is, by including the curved member 725, the connector 700 may reduce the pressure loss of the wash water. As a result, a spray intensity of the wash water sprayed from the spray device 40** may not decrease.

The support 400 may include the connector holder 450. The connector 700 may be provided to be supported by the connector holder 450. The connector 700 may be provided to be mounted on the connector holder 450. The connector 700 may be detachably coupled to the connector holder 450. The connector 700 may be coupled to the sump housing 100 while the connector 700 is supported by the connector holder 450.

Meanwhile, it is illustrated that the support 400 is a component separated from the sump housing 100 in the drawing, but is not limited thereto. At least a portion of the support 400 may be integrally formed with the sump housing 100. For example, the connector holder 450 may not be provided as one component of the support 400 but may be integrally formed with the sump housing 100 and provided as one component of the sump housing 100. In this case, the extension portion 722 of the connector 700 may be locked to the sump housing 100.

For example, the connector holder 450 may include a connector holder body 452 provided to be in contact with the outer surface of the connection flange 721. The connector holder body 452 may be provided to surround the outer surface of the connection flange 721. The connector holder body 452 may be provided to hold the outer surface of the connection flange 721 in a radial direction. An inner surface of the connector holder body 452 may be provided to be in contact with the outer surface of the connection flange 721.

Figure 11:
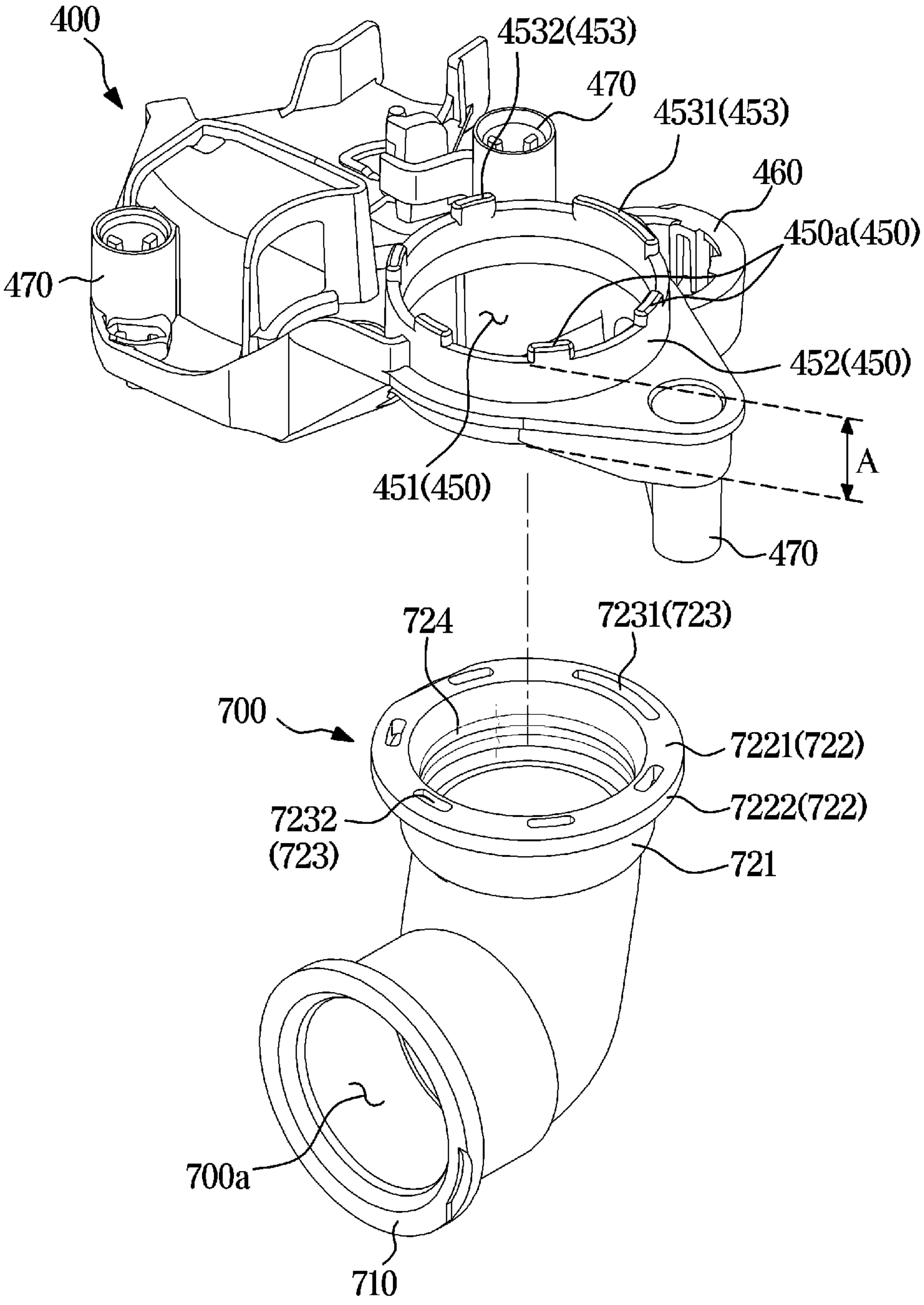
FIG. 11 is a view illustrating a state in which a holder and a connector of the sump assembly of the dishwasher according to an embodiment of the disclosure are separated.

For example, the connector holder 450 may be provided to have a predetermined height A (refer to FIG. 11). For example, the connector holder body 452 may be provided to have a predetermined height A. Accordingly, the connector 700 may be stably supported by the support 400.

The connector holder body 452 may be referred to as a holder body 452.

For example, the connector holder 450 may include a connector holder opening 451 formed by the connector holder body 452. The connection flange 721 of the connector 700 may be inserted into the connector holder opening 451. Accordingly, the outer surface of the connection flange 721 may be covered by the connector holder body 452.

For example, the connector holder opening 451 may have a circular shape, and the connector holder body 452 may have a cylindrical shape surrounding a circumference of the connector holder opening 451. However, this is only exemplary, and is not limited thereto.

The connector holder opening 451 may be referred to as a holder opening 451.

In general, when connecting the connector to the distribution device or to the sump housing (e.g., when the distribution device is provided in the sump housing), the connector may be separated due to the high pressure of the water.

In the case of conventional dishwashers, in order to prevent separation of the connector, an additional component, such as a clamp, is provided or an operation, such as insert injection, is performed.

For example, the clamp may restrain and connect the connector and the connection component (e.g., the sump housing, the distribution device, etc.) and prevent leakage of wash water between the connector and the connection component. However, because the clamp constrains a portion of the connector, the shape of the connector may be deformed. Accordingly, the flow of wash water flowing inside the connector may not be smooth. In addition, when the clamp is coupled in a state in which the connector and the connection component are incorrectly assembled, it is very difficult to return the connector and the connection component to their original shape, and quality issues may continue to occur until the clamp is disassembled and the connector and the connection component are replaced. In addition, when using the clamp, a working space for restraining the connector may be required. That is, a distance that is greater than or equal to a predetermined range is required between components of the sump assembly to secure a space for clamping, and as a result, the size of the sump assembly may increase. That is, as the size of the sump assembly increases, the height of the machine room L may increase and the height of the washing chamber C may decrease accordingly.

For example, the insert injection process may be very complex, which may cause a significant increase in the cost and time to manufacture the sump assembly.

According to an embodiment of the present disclosure, the inner surface of the connection flange 721 of the connector 700 may be provided to be in contact with the outer surface of the inlet port 123 of the sump housing 100. The inner surface of the connector holder body 452 of the support 400 may be provided to be in contact with the outer surface of the connection flange 721 of the connector 700. In addition, the extension portion 722 of the connector 700 may be provided to extend from the connection flange 721 and locked to the support 400.

For example, connection flange 721 of connector 700 may hold the inlet port 123 in the radial direction. The connector holder body 452 of the support 400 may hold the connection flange 721 in the radial direction. Accordingly, when the wash water flows, the sump housing 100 and the connector 700 may not be easily separated from each other even when a force generated in an approximately vertical direction is applied due to a high pressure of the wash water. In addition, the extension portion 722 of the connector 700 may be caught on the upper end of the support 400 and stably supported by the support 400. Accordingly, the connector 700 may not easily fall out of the sump housing 100 downward.

According to an embodiment of the present disclosure, the sump housing 100 and the connector 700 may be firmly connected without a separate additional configuration (e.g., a clamp, etc.) or a separate process (e.g., insert injection, etc.). In the dishwasher 1 according to the present disclosure, a clamp for connecting the connector 700 may not be required, and thus quality issues such as the mis-assembly due to the use of the clamp may not occur, and a large space for clamping may not be required. In addition, because a separate insert injection process is not required, it is possible to more simplify the process and to reduce the manufacturing cost.

For example, when a part of the connector is generally restrained by the clamp, a connection flange having a predetermined length or more may be required for a part of the connector in order to prevent quality issues, such as the mis-assembly, as much as possible. However, referring to FIG. 8, a length H of the connection flange 721 of the connector 700 according to the present disclosure may be less than a length of the connection flange of the connector that requires the clamp. Accordingly, a radius of curvature of the curved member 725 of the connector 700 may be set larger, and a length of the inlet flow path 700*a* of the connector 700 may be set shorter. As a result, it is possible to prevent a decrease in the pressure of the wash water. For example, referring to FIG. 10, the connection shaft 220 of the distribution device 200 and the connector 700 may be spaced apart at a minimum distance G that does not interfere. That is, because the connection shaft 220 of the distribution device 200 and the connector 700 are arranged as closely as possible, the sump assembly 70 may include a compact structure.

Figure 12:
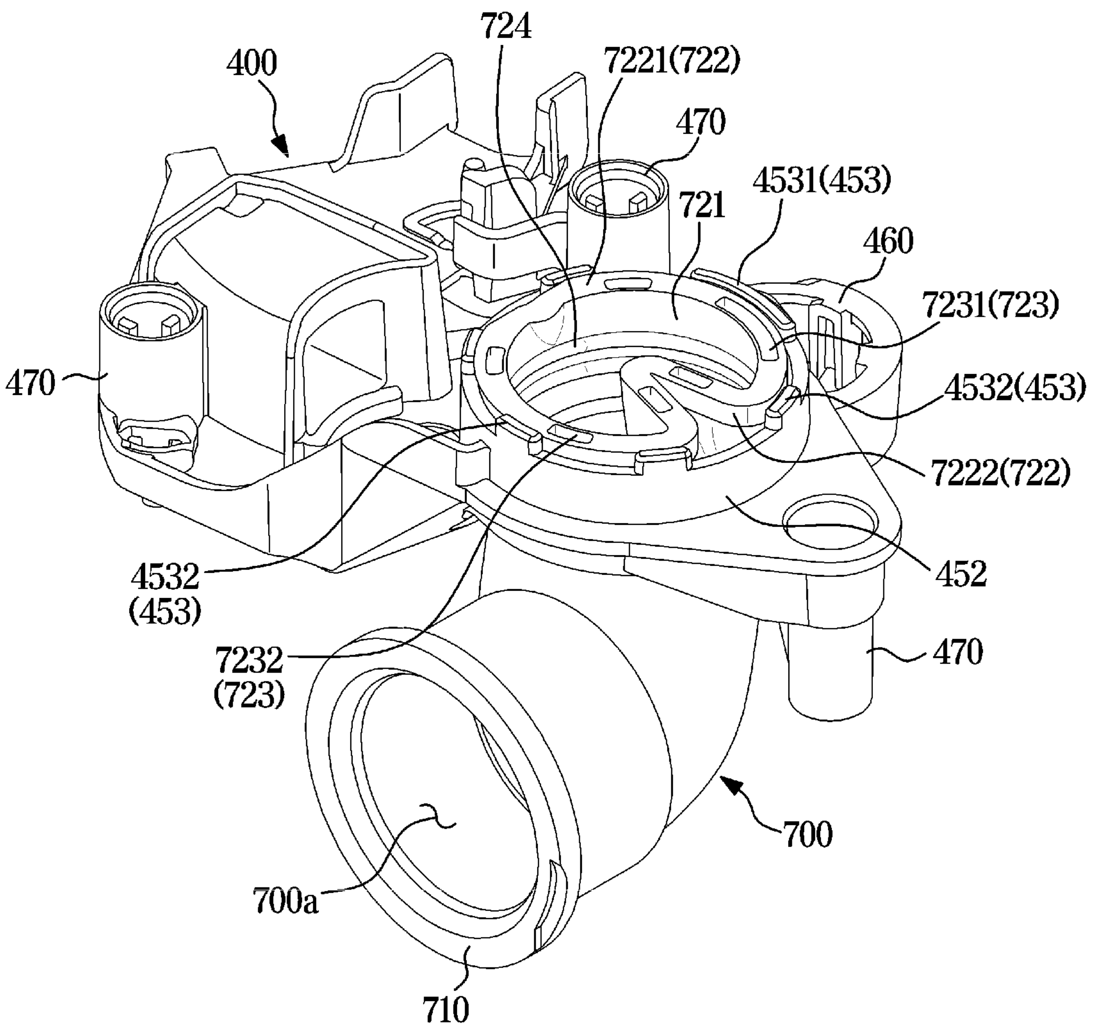
FIG. 12 is a view illustrating a state in which the holder and the connector of the sump assembly of the dishwasher according to an embodiment of the disclosure are being coupled.
Figure 13:
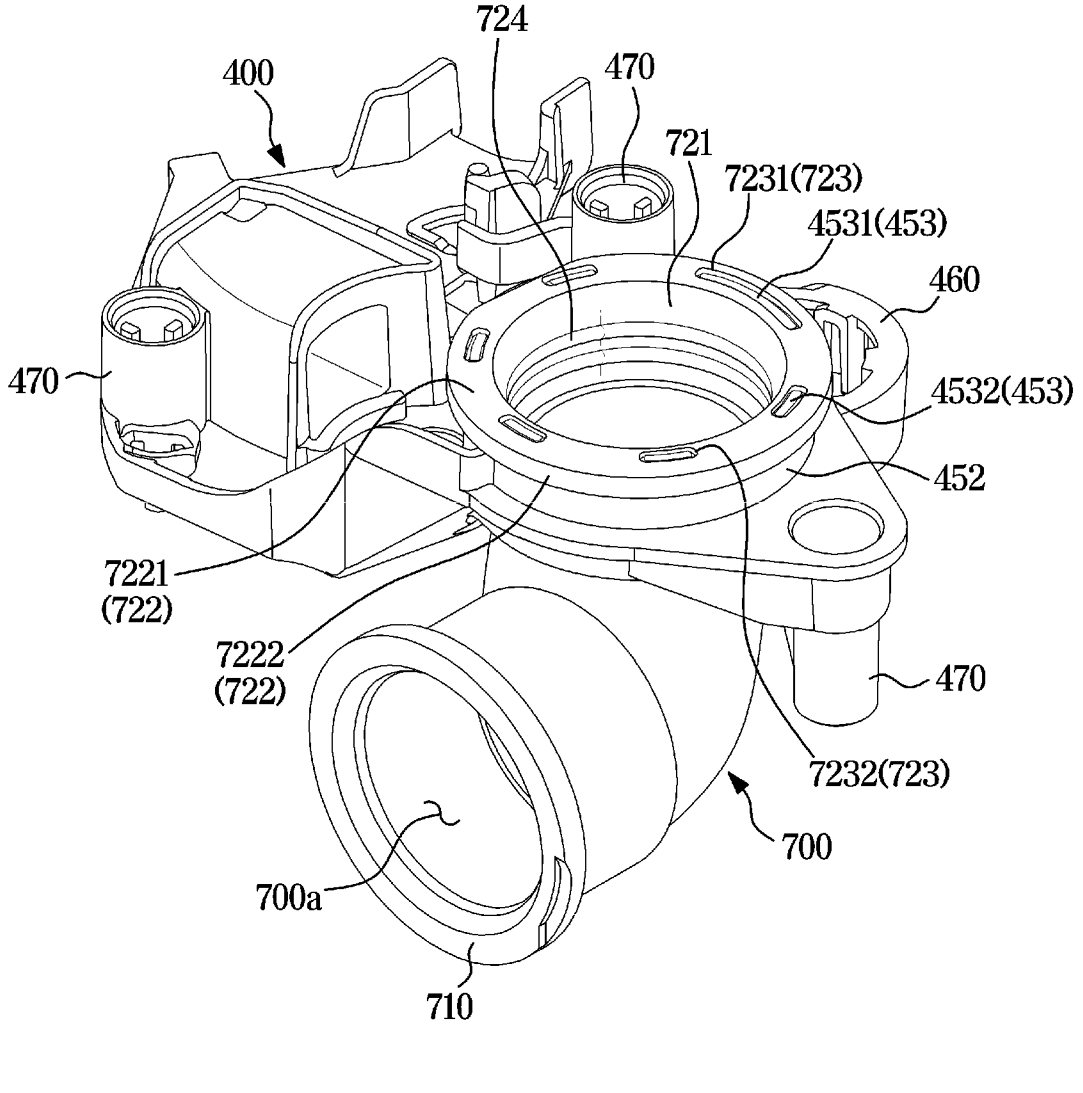
FIG. 13 is a view illustrating a state in which the holder and the connector of the sump assembly of the dishwasher according to an embodiment of the disclosure are coupled to each other.

FIG. 11 is a view illustrating a state in which a holder and a connector of the sump assembly of the dishwasher according to an embodiment are separated. FIG. 12 is a view illustrating a state in which the holder and the connector of the sump assembly of the dishwasher according to an embodiment are being coupled. FIG. 13 is a view illustrating a state in which the holder and the connector of the sump assembly of the dishwasher according to an embodiment are coupled to each other.

Referring to FIGS. 11 to 13, the connector 700 may be detachably coupled to the connector holder 450 of the support 400.

For example, the extension portion 722 of the connector 700 may include a first extension portion 7221 and a second extension portion 7222.

The first extension portion 7221 may extend radially outward from an upper end of the connection flange 721. In a state in which the connector 700 is coupled to the support 400, the first extension portion 7221 may cover an upper end of the connector holder body 452 of the connector holder 450.

The second extension portion 7222 may extend downward from the first extension portion 7221. In a state in which the connector 700 is coupled to the support 400, the second extension portion 7222 may cover the outer surface of the connector holder body 452.

The connector 700 may include a coupling protrusion hole 723. The coupling protrusion hole 723 may be coupled to the connector coupler 450*a*. The coupling protrusion hole 723 may be inserted into the connector coupler 450*a*.

The coupling protrusion hole 723 may be formed in the extension portion 722. The coupling protrusion hole 723 may be formed in the first extension portion 7221. The coupling protrusion hole 723 may be formed to penetrate the first extension portion 7221. However, it is not limited thereto, and the coupling protrusion hole 723 may be provided in a shape in which the lower side of the first extension portion 7221 is partially recessed. The shape of the coupling protrusion hole 723 is not limited thereto. The coupling protrusion hole 723 may be referred to as a coupling protrusion groove 723.

The coupling protrusion hole 723 of the connector 700 may be provided to correspond to the connector coupler 450*a* of the support 400. The coupling protrusion hole 723 may be provided to correspond to a coupling protrusion 453 of the support 400 to be described later. The coupling protrusion hole 723 and the coupling protrusion 453 may be detachably coupled. The coupling protrusion 453 may be inserted into the coupling protrusion hole 723.

For example, the coupling protrusion holes 723 may be provided in plurality. The plurality of coupling protrusion holes 723 may be arranged spaced apart from each other along the circumferential direction. In the drawings, six coupling protrusion holes 723 are provided, but it is not limited thereto. Alternatively, five or less or seven or more of coupling protrusion holes 723 may be provided.

However, it is not limited to the example shown in the drawings, and for example, the coupling protrusion hole 723 of the connector 700 may not be coupled to the coupling protrusion 453 of the support 400, but coupled to a protrusion (not shown) extending from the sump housing 100.

The support 400 may include the connector coupler 450*a* for coupling with the connector 700. The connector coupler 450*a* may be formed in the connector holder 450. The connector coupler 450*a* may extend or protrude from the connector holder 450. The connector coupler 450*a* may protrude toward the guide member. For example, the connector coupler 450*a* may extend from the connector holder body 452 to be coupled to the connector 700. For example, the connector coupler 450*a* may protrude from the connector holder body 452 to be coupled to the connector 700. For example, the connector coupler 450*a* may protrude upward from the connector holder body 452. The connector coupler 450*a* may be referred to as a coupler 450*a*.

For example, the connector coupler 450*a* may include the coupling protrusion 453. For example, the coupling protrusion 453 may protrude upward from an upper end of the connector holder body 452. The coupling protrusion 453 may correspond to the coupling protrusion hole 723 of the connector 700. The coupling protrusion 453 may be detachably coupled to the coupling protrusion hole 723. The coupling protrusion 453 may be inserted into the coupling protrusion hole 723.

For example, the coupling protrusions 453 may be provided in plurality. The coupling protrusions 453 may be provided in the same number as the coupling protrusion holes 723. The plurality of coupling protrusions 453 may be spaced apart from each other along the circumferential direction. In the drawings, six coupling protrusions 453 are provided, but it is not limited thereto. Alternatively, five or less or seven or more of coupling protrusions 453 may be provided.

Meanwhile, at least one of the plurality of coupling protrusion holes 723 may have a shape different from the rest of the plurality of coupling protrusion holes 723. The plurality of coupling protrusions 453 may be provided in a shape corresponding to the plurality of coupling protrusion holes 723.

For example, at least one coupling protrusion hole 7231 of the plurality of coupling protrusion holes 723 may be longer than the remaining coupling protrusion holes 7232. Similarly, at least one coupling protrusion 4531 among the plurality of coupling protrusions 453 may have a longer length than the other coupling protrusions 4532. The coupling protrusion hole 7231 may correspond to the coupling protrusion 4531, and the coupling protrusion hole 7232 may correspond to the coupling protrusion 4532. Accordingly, the assembly direction of the connector 700 and the support 400 may be accurately set. For example, by matching the shape of the plurality of coupling protrusion holes 723 and the shape of the plurality of coupling protrusions 453, a user can accurately assemble the connector 700 and the support 400 without the mis-assembly. As a result, the assemblability of the sump assembly 70 of the dishwasher 1 may be improved.

An example of a coupling process between the connector 700 and the support 400 will be described with reference to FIGS. 11 to 13.

Referring to FIG. 11, the connector 700 and the support 400 aligned in a correct assembly position may be prepared. For example, the arrangement of the connector 700 and the support 400 may be adjusted to allow the shapes of the plurality of coupling protrusion holes 723 to correspond to the shapes of the plurality of coupling protrusions 453. For example, the connector 700 and the support 400 corresponding to each other may be coupled in a substantially vertical direction.

Referring to FIG. 12, the other end 720 of the connector 700 may be inserted into the connector holder opening 451 of the holder 450 as the other end 720 of the connector 700 is deformed. For example, the other end 720 of the connector 700 may be elastically deformed.

For example, the connector 700 may include silicon or an ethylene propylene diene monomer (EPDM) material. Accordingly, the connector 700 may be easily compressed and may not be deformed even in high-temperature wash water. In addition, because the connector 700 is strong against vibration, it is possible to reduce noise that may occur when wash water flows.

Referring to FIG. 13, the extension portion 722 of the connector 700 may be provided to be locked to the support 400. The connector 700 may be coupled to the support 400 as the coupling protrusion 453 of the support 400 is inserted into the coupling protrusion hole 723 of the connector 700. Thereafter, the support 400, to which the connector 700 is coupled, may be detachably coupled to the lower side of the sump housing 100. At this time, the connector 700 may be arranged to correspond to the inlet port 123. For example, the connection flange 721 of the connector 700 may be in contact with the outer surface of the inlet port 123 and communicate with the distribution chamber 121 through the inlet port 123. Further, the sump coupler 470 of the support 400 may be coupled to the support coupler 160 of the sump housing 100. For example, the sump coupler 470 and the support coupler 160 may be fixed to each other by a screw S.

Figure 14:
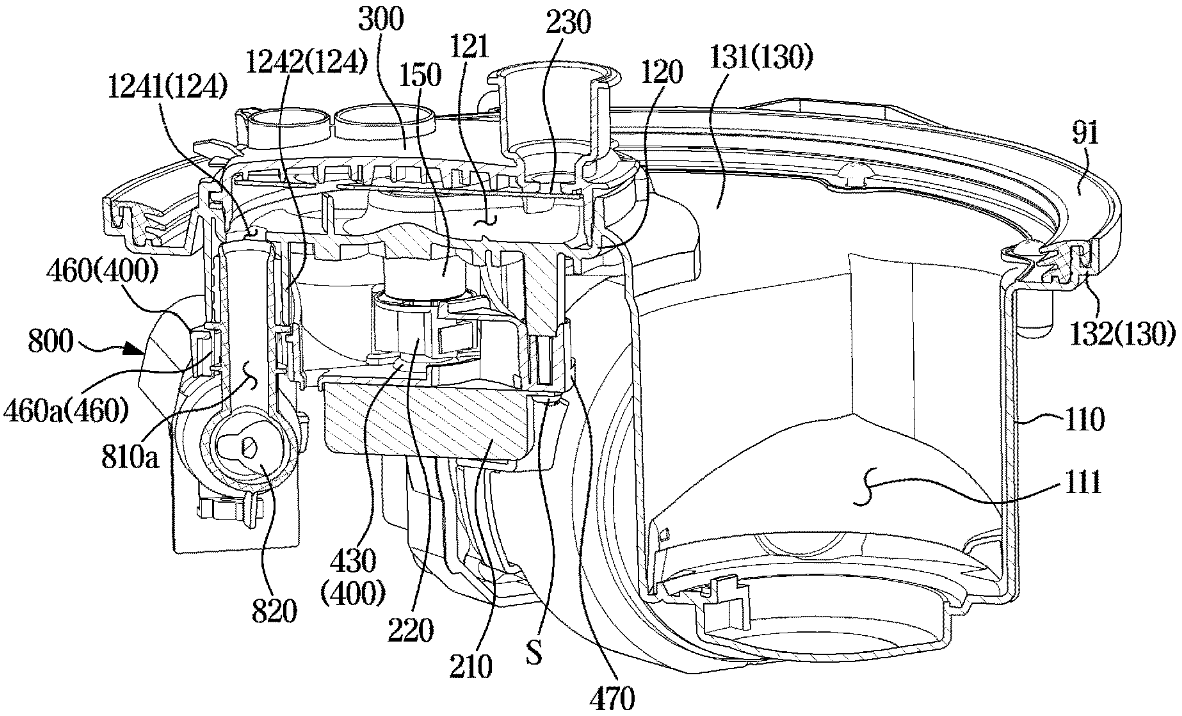
FIG. 14 is a perspective view illustrating a state in which the sump assembly of the dishwasher according to an embodiment of the disclosure is taken along a line.
Figure 15:
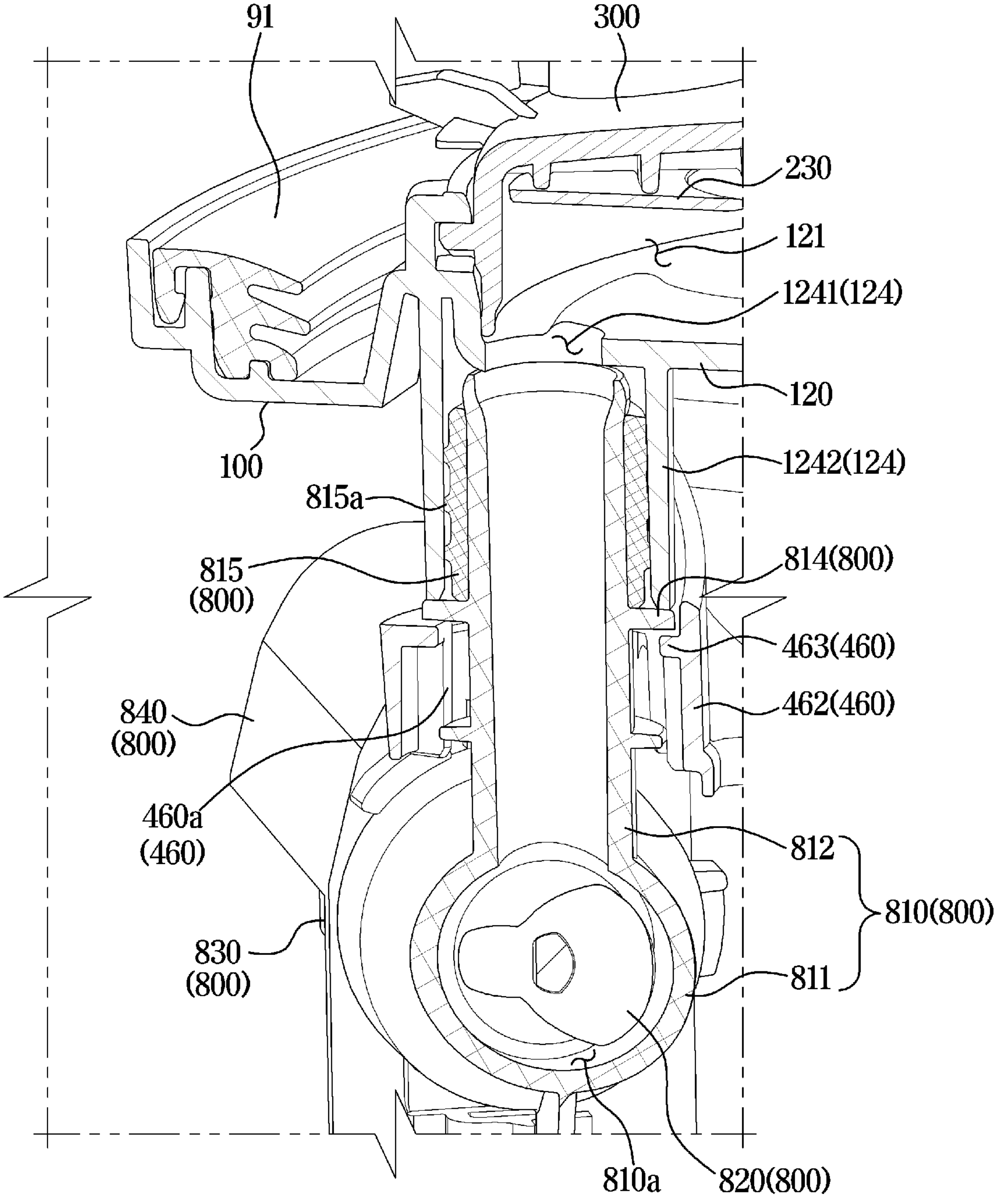
FIG. 15 is a partial cross-sectional view of the sump assembly shown in FIG. 14 according to an embodiment of the disclosure.
Figure 16:
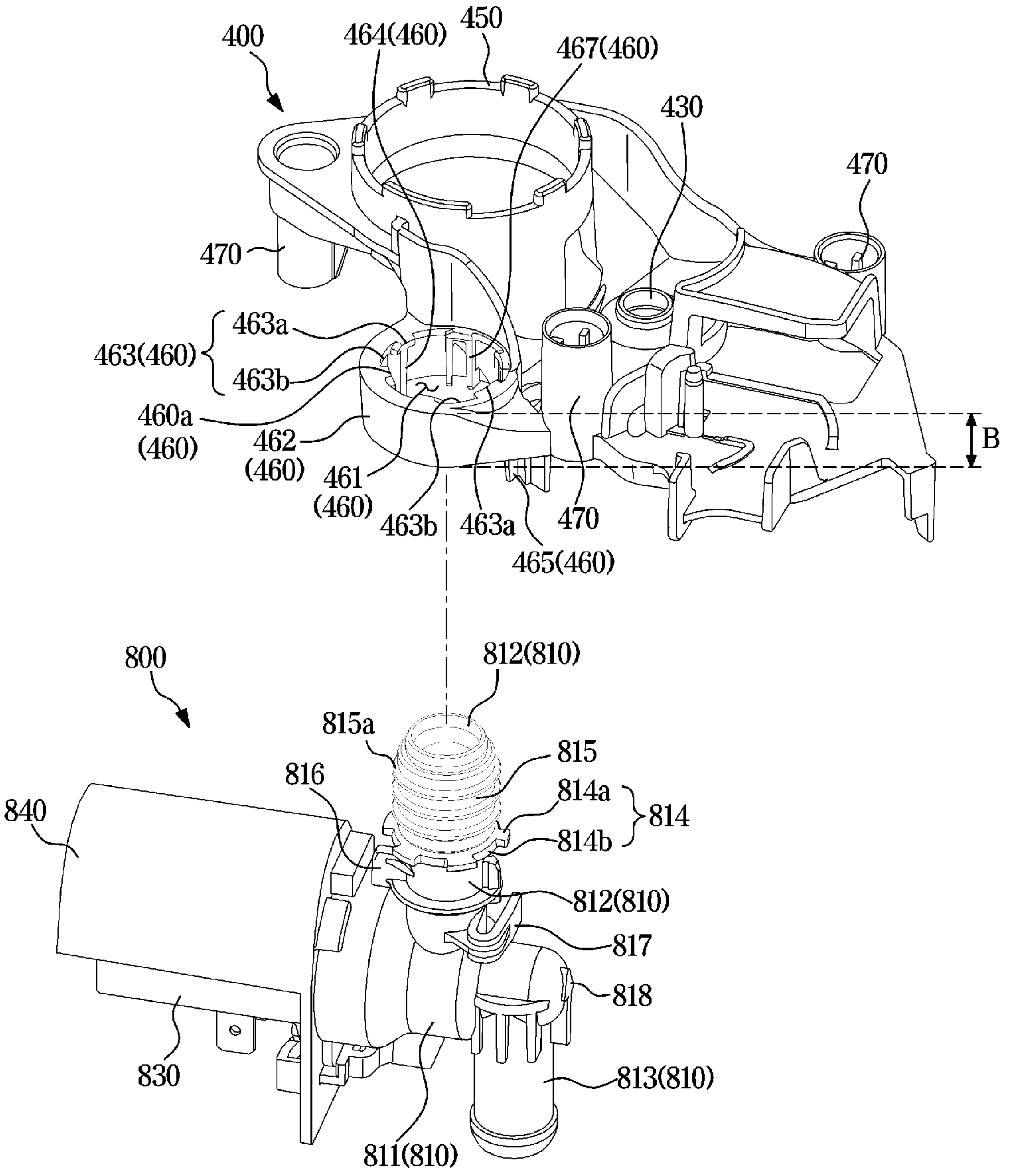
FIG. 16 is a view illustrating a state in which the holder and a valve assembly of the sump assembly of the dishwasher according to an embodiment of the disclosure are separated.
Figure 17:
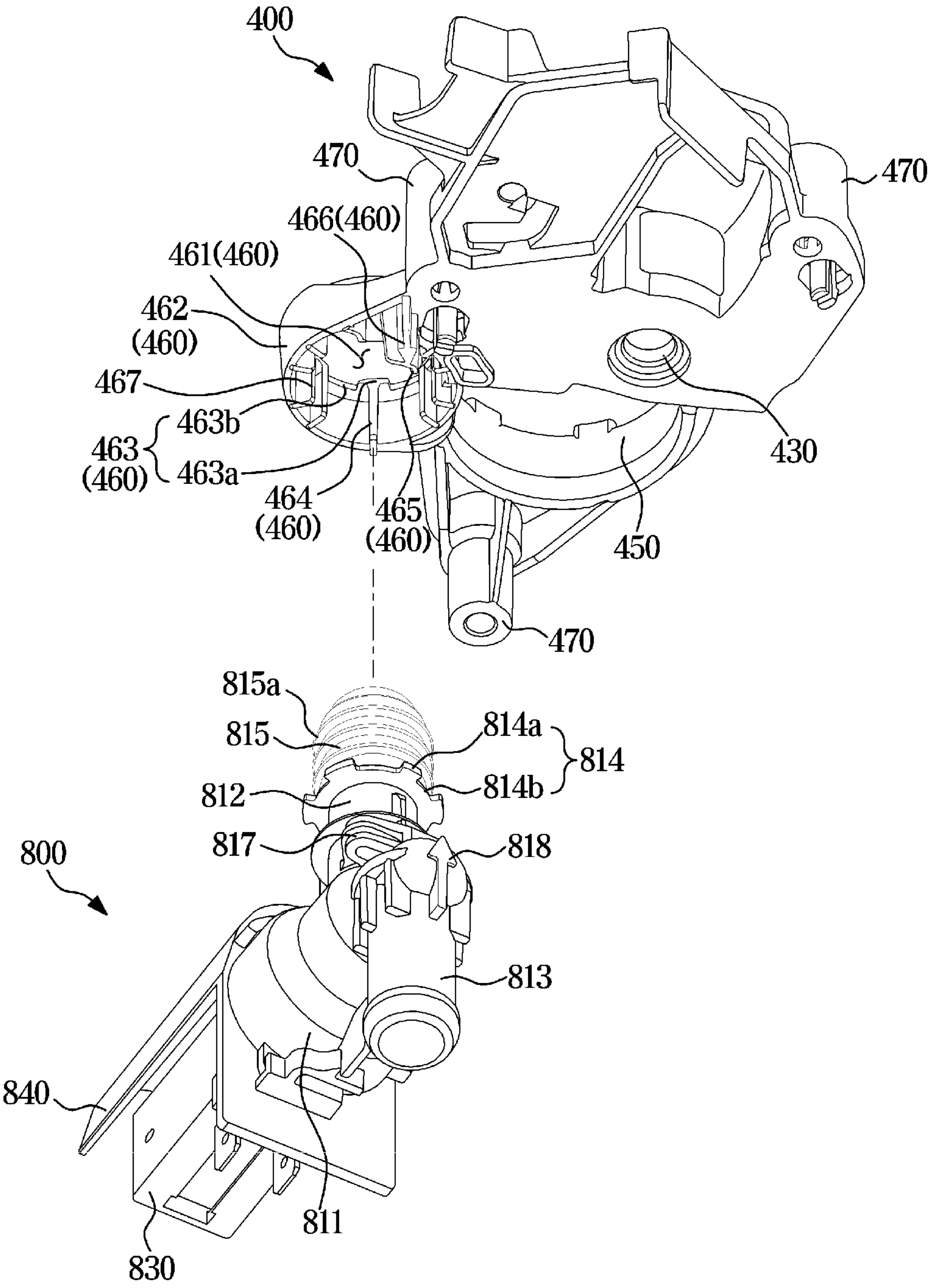
FIG. 17 is a bottom view of the holder and valve assembly of the sump assembly shown in FIG. 16 according to an embodiment of the disclosure.
Figure 18:
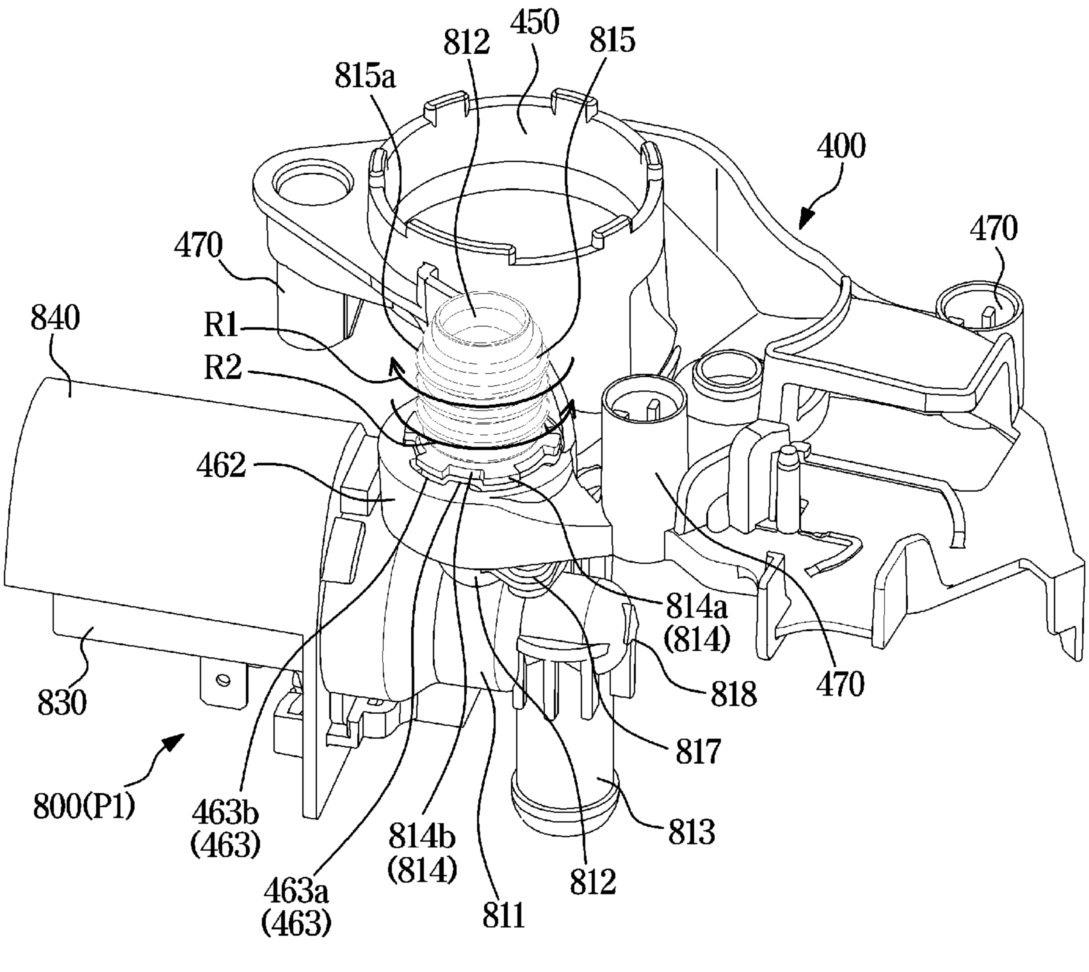
FIG. 18 is a view illustrating a state in which the holder and the valve assembly of the sump assembly of the dishwasher according to an embodiment of the disclosure are detachably coupled (the valve assembly is in a first position)
Figure 19:
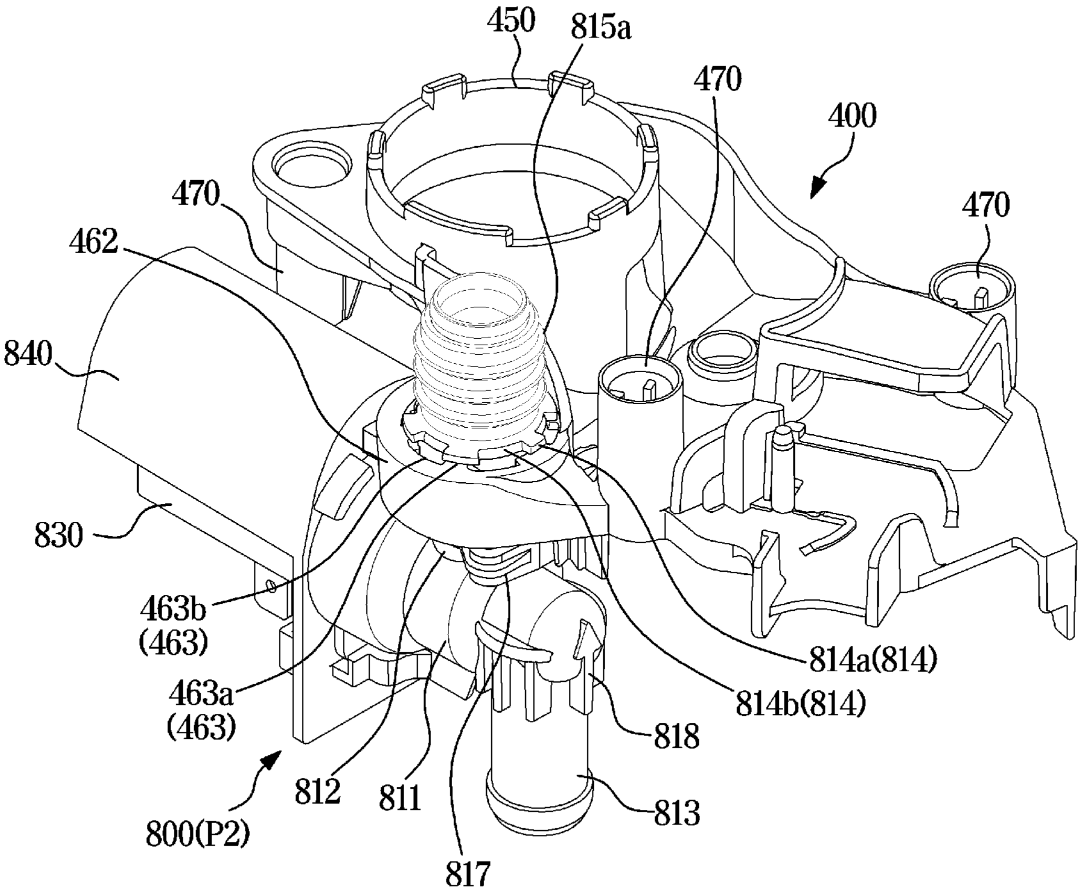
FIG. 19 is a view illustrating a state in which the valve assembly shown in FIG. 18 is rotated (a state in which the valve assembly is in a second position) according to an embodiment of the disclosure.

FIG. 14 is a perspective view illustrating a state in which the sump assembly of the dishwasher according to an embodiment is taken along a line. FIG. 15 is a partial cross-sectional view of the sump assembly shown in FIG. 14. FIG. 16 is a view illustrating a state in which the holder and a valve assembly of the sump assembly of the dishwasher according to an embodiment are separated. FIG. 17 is a bottom view of the holder and valve assembly of the sump assembly shown in FIG. 16. FIG. 18 is a view illustrating a state in which the holder and the valve assembly of the sump assembly of the dishwasher according to an embodiment are detachably coupled (the valve assembly is in a first position). FIG. 19 is a view illustrating a state in which the valve assembly shown in FIG. 18 is rotated (a state in which the valve assembly is in a second position).

Referring to FIGS. 14 to 19, the valve assembly 800 may be detachably coupled to the sump housing 100. The valve assembly 800 may be connected to the outlet port 124 to communicate with the distribution chamber 121. The valve assembly 800 may be mounted on the support 400. As the valve assembly 800 rotates, the valve assembly 800 may be fixed to the support 400.

The sump housing 100 may include the outlet port 124 through which wash water flows toward the valve assembly 800. The outlet port 124 may be provided below the distribution chamber 121 and communicate with the distribution chamber 121.

For example, the outlet port 124 may communicate with the distribution chamber 121 in a substantially vertical direction. For example, the outlet port 124 may be formed in the chamber bottom 121*a*. For example, the valve assembly 800 may communicate with the outlet port 124 in a substantially vertical direction. Accordingly, wash water flowing out of the distribution chamber 121 through the outlet port 124 may directly flow into the valve assembly 800. As a result, the flow loss of the wash water may be reduced, and the flow of the wash water may be smooth.

For example, the outlet port 124 may include an outlet 1241 communicating with the distribution chamber 121. The outlet port 124 may include an outlet flange 1242 corresponding to the outlet 1241 and extending downward from the distribution chamber 121.

For example, the outlet 1241 may have a circular shape, and the outlet flange 1242 may have a cylindrical shape surrounding a circumference of the outlet 1241. However, this is only exemplary, and is not limited thereto. For example, the outlet 1241 may have a polygonal shape, and the outlet flange 1242 may have a polygonal pillar shape.

The valve assembly 800 may guide wash water flowing out of the distribution chamber 121 to the water tank 15.

The valve assembly 800 may include a valve housing 810 forming the outlet flow path 810*a*. Wash water discharged from the distribution chamber 121 may flow along the outlet flow path 810*a*. Wash water passing through the outlet flow path 810a may flow into the water tank 15 (refer to FIG. 1). For example, wash water passing through the outlet flow path 810a may flow into the water tank 15 via the return pipe 23.

For example, the valve housing 810 may include a housing body 811, a first connection pipe 812, and a second connection pipe 813.

The housing body 811 may accommodate at least a portion of a plunger 820 to be described later.

The first connector 812 may be connected to the outlet port 124. The first connection pipe 812 may be coupled to the outlet port 124 to communicate with the distribution chamber 121. The first connection pipe 812 may be arranged inside the outlet flange 1242, and connected to the distribution chamber 121. The first connection pipe 812 may be connected to the distribution chamber 121 by being coupled to an inner surface of the outlet flange 1242. The first connection pipe 812 may communicate with the distribution chamber 121 in a substantially vertical direction. For example, the first connection pipe 812 may extend upward from the housing body 811.

The second connection pipe 813 may be directly connected to the water tank 15 or indirectly connected to the water tank 15 through the return pipe 23. For example, the second connection pipe 813 may extend downward from the housing body 811.

The valve assembly 800 may include a first locking member 814. For example, the first locking member 814 may be formed on the valve housing 810. For example, the first locking member 814 may be formed on the first connection pipe 812. As the valve assembly 800 rotates, the first locking member 814 may be locked to the support 400 or may be released from the support 400. As the valve assembly 800 rotates, the first locking member 814 may be locked to a second locking member 463 to be described later or released from the second locking member 463 to be described later. A detailed description thereof will be described later.

The valve assembly 800 may include a valve sealing protrusion 815a.

The valve sealing protrusion 815a may be provided to prevent water leakage between the sump housing 100 and the valve assembly 800. The valve sealing protrusion 815a may protrude toward the sump housing 100 from an outer surface of the first connection pipe 812. The valve sealing protrusion 815a may protrude toward the outlet port 124 from the outer surface of the first connection pipe 812. The valve sealing protrusion 815a may protrude from the outer surface of the first connection pipe 812 toward an inner surface of the outlet flange 1242. The valve sealing protrusion 815a may be in contact with the inner surface of the outlet flange 1242.

For example, the valve sealing protrusion 815a may include a plurality of sealing protrusions. The plurality of sealing protrusions may be spaced apart from each other in the up and down direction. However, it is not limited thereto, and the valve sealing protrusion 815a may be provided as a single sealing protrusion.

For example, the valve sealing protrusion 815a may have a ring shape extending along a circumferential direction of the first connection pipe 812. However, this is merely exemplary, and the shape of the valve sealing protrusion 815a is not limited as long as the valve sealing protrusion 815a seals between the sump housing 100 and the connector 700.

Meanwhile, as shown in FIG. 15, the valve assembly 800 may include a separate valve sealing member 815 including a valve sealing protrusion 815a. The valve sealing member 815 may be coupled to the outer surface of the first connection pipe 812. However, this is merely exemplary, and the valve sealing member 815 may be integrally formed with the first connection pipe 812.

The valve assembly 800 may include the plunger 820. At least a portion of the plunger 820 may be arranged inside the valve housing 100 to open and close the outlet flow path 810a. For example, the plunger 820 may be provided to move forward and backward within the valve housing 100, and the outlet flow path 810a may be opened or closed by the movement of the plunger 820. For example, the outlet flow path 810a may be closed during the washing or rinsing operation. The outlet flow path 810a may be opened in response the completion of the rising operation. Accordingly, the wash water used in the rinsing operation may be stored in the water tank 15 via the valve assembly 800.

For example, a portion of the plunger 820 may be arranged in the valve housing 810 and the remaining portion of the plunger 820 may be arranged in a valve casing 830 to be described later. The plunger 820 may be connected to a valve actuator (not shown) to be described later.

The valve assembly 800 may include the valve casing 830. The valve casing 830 may accommodate the valve actuator (not shown), and the valve actuator (not shown) may drive the plunger 820. For example, the valve actuator (not shown) may be configured to drive the plunger 820 by an electrical signal.

The valve assembly 800 may include a valve cover 840. The valve cover 840 may cover an upper portion of the valve casing 810 to prevent wash water from flowing into the valve casing 810. For example, the valve cover 840 may have a substantially downwardly inclined shape. The valve cover 840 may include a downwardly curved shape. Accordingly, without flowing into the valve casing 810, the wash water may be guided by the valve cover 840 and fall downward.

The support 400 may include the valve holder 460. The valve assembly 800 may be provided to be supported by the valve holder 460. The valve assembly 800 may be provided to be mounted on the valve holder 460. The valve assembly 800 may be detachably coupled to the valve holder 460. The valve assembly 800 may be coupled to the sump housing 100 in a state in which the valve assembly 800 is supported by the valve holder 460.

Meanwhile, it is illustrated that the support 400 is a component separated from the sump housing 100 in the drawing, but is not limited thereto. At least a portion of the support 400 may be integrally formed with the sump housing 100. For example, the valve holder 460 may not be provided as a component of the support 400, but may be formed integrally with the sump housing 100 and provided as a component of the sump housing 100. In this case, the valve assembly 800 may be provided to be locked to the sump housing 100.

For example, the valve holder 460 may include a valve holder opening 461 into which the first connection pipe 812 is inserted. For example, the valve holder 460 may include a valve holder body 462 provided to support the first connection pipe 812 and provided to form the valve holder opening 461. At least a portion of the first connection pipe 812 may be covered by the valve holder body 462.

For example, the valve holder 460 may be provided to have a predetermined height B (refer to FIG. 16). For example, the valve holder body 462 may be provided to have a predetermined height B. Accordingly, the valve assembly 800 may be stably supported by the support 400.

The valve holder body 462 may be referred to as a holder body 462.

For example, the valve holder opening 461 may have a circular shape, and the valve holder body 462 may have a cylindrical shape surrounding a circumference of the valve holder opening 461. However, this is only exemplary, and is not limited thereto.

The valve holder opening 461 may be referred to as a holder opening 461.

The support 400 may include the valve coupler 460*a* for coupling with the valve assembly 800. The valve coupler 460*a* may be formed in the valve holder 460. The valve coupler 460*a* may extend or protrude from the valve holder 460. The valve coupler 460*a* may protrude toward the guide member. For example, the valve coupler 460*a* may extend from the valve holder body 462 to be coupled to the valve assembly 800. For example, the valve coupler 460*a* may protrude from the valve holder body 462 to be coupled to the valve assembly 800. For example, the valve coupler 460*a* may protrude from the valve holder body 462 in the radial direction. For example, the valve coupler 460*a* may protrude from an inner surface of the valve holder body 462. The valve coupler 460*a* may be referred to as a coupler 460*a*.

For example, the valve coupler 460*a* may include a coupling protrusion 467. The coupling protrusion 467 may protrude toward the valve assembly 800 from an inner surface of the valve holder body 462. The coupling protrusion 467 may be provided to support at least a portion of the valve housing 810 of the valve assembly 800. The coupling protrusion 467 may be provided to be coupled to the outer surface of the first connection pipe 812. The coupling protrusion 467 may be provided to be in contact with the outer surface of the first connection pipe 812.

The coupling protrusion 457 may be provided in plurality. For example, the plurality of coupling protrusions 457 may be spaced apart from each other along a circumferential direction of the valve holder body 462. However, it is not limited thereto, and a single coupling protrusion 457 may be provided.

For example, the valve coupler 460*a* may include the second locking member 463. For example, the second locking member 463 may be formed at an upper end of the valve holder body 462. For example, the second locking member 463 may be formed at an upper end of the coupling protrusion 457. For example, the second locking member 463 may be integrally formed with the coupling protrusion 457. The valve assembly 800 may be provided to be locked to the second locking member 463. The valve assembly 800 may be supported by the second locking member 463. As the valve assembly 800 rotates, the first locking member 814 may be locked to or released from the second locking member 463. A detailed description thereof will be described later.

In generally, the valve assembly may be easily separated from the distribution device or the sump housing by the high pressure of the water in the sump assembly.

In the case of conventional dishwashers, in order to prevent separation of the valve assembly, an additional configuration (e.g., a clamp) is provided or an operation such as insert injection is performed. In addition, in the case of conventional dishwashers, a valve assembly is connected to a distribution device or a sump housing using a separate fixing component (e.g., a hose).

For example, the clamp may restrain a portion of the object, as described above. Accordingly, when using the clamp, the shape of the valve assembly may be deformed, and the flow of wash water may not be smooth. In addition, when the clamp is coupled in a state in which the valve assembly and the connection component are not properly aligned, a mis-assembly issue may occur. In addition, because a space for clamping is required, a distance that is greater than or equal to a predetermined range is required between components of the sump assembly to secure a space for clamping, and as a result, the size of the sump assembly may increase. That is, as the size of the sump assembly increases, the height of the machine room L may increase and the height of the washing chamber C may decrease accordingly.

For example, when connecting the valve assembly to the distribution device or the sump housing using a separate fixing component, such as a hose, the assembly time and cost may be increased. In addition, because the length of the flow path from the distribution device or the sump housing to the valve assembly is increased, the flow of wash water may not be smooth.

For example, the insert injection process may be very complex, which may cause a significant increase in the cost and time to manufacture the sump assembly.

According to an embodiment of the present disclosure, the valve assembly 800 may be directly coupled to the sump housing 100 and supported by the support 400. As the valve assembly 800 rotates, the valve assembly 800 may be locked to the support 400 or released from the support 400. That is, the valve assembly 800 may be stably supported by the support 400 through a simple manipulation. In addition, the valve assembly 800 may be firmly fixed to the sump housing 100 through the support 400. Accordingly, the sump housing 100 and the valve assembly 800 may not be easily separated even when an approximately vertical force generated by the high pressure of the wash water is applied. That is, the sump housing 100 and the valve assembly 800 may be stably coupled without a separate member (e.g., a clamp, a hose, etc.) and/or a separate process (e.g., insert injection, etc.). Accordingly, the production cost and assembly cost of the dishwasher may be reduced. In addition, because a separate member is not required between the sump housing 100 and the valve assembly 800, a space for connecting or mounting the separate member may not be required. Accordingly, the configuration of the sump assembly 70 may be compactly arranged.

Referring to FIGS. 16 to 19, the valve assembly 800 may include the first locking member 814. The support 400 may include the second locking member 463. The first locking member 814 and the second locking member 463 may be provided in shapes corresponding to each other. For example, the first locking member 814 may include a shape protruding outward from the valve housing 810. For example, the second locking member 463 may include a shape protruding radially inward from the valve holder 460.

For example, the first locking member 814 of the valve assembly 800 may include a first locking protrusion 814*a* and a first locking protrusion groove 814*b*.

The first locking protrusion 814*a* may protrude radially outward from an outer surface of the first connection pipe 812. For example, the first locking protrusion 814*a* may be provided in plurality, and each of the plurality of first locking protrusions 814*a* may be spaced apart from each other. Each of the plurality of first locking protrusions 814*a* may be spaced apart from each other in the circumferential direction.

The first locking protrusion groove 814*b* may be provided to be relatively recessed than the first locking protrusion 814*a*. For example, the first locking protrusion groove 814*b* may be provided in plurality, and each of the plurality of first locking protrusion grooves 814*b* may be arranged between two adjacent first locking protrusions 814*a* among the plurality of first locking protrusions 814*a*. That is, each of the plurality of first locking protrusions 814*a* and each of the plurality of first locking protrusion grooves 814*b* may be provided to be alternately arranged along the circumferential direction.

For example, the second locking member 463 of the support 400 may include a second locking protrusion 463*a* and a second locking protrusion groove 463*b*.

The second locking protrusion 463*a* may protrude radially inward from the inner surface of the valve holder body 462. For example, the second locking protrusion 463*a* may be provided in plurality, and each of the plurality of second locking protrusions 463*a* may be spaced apart from each other. Each of the plurality of second locking protrusions 463*a* may be spaced apart from each other in the circumferential direction.

The second locking protrusion groove 463*b* may be provided to be relatively recessed than the second locking protrusion 463*a*. For example, the second locking protrusion groove 463*b* may be provided in plurality, and each of the plurality of second locking protrusion grooves 463*b* may be arranged between two adjacent second locking protrusions 463*a* among the plurality of second locking protrusions 463*a*. That is, each of the plurality of second locking protrusions 463*a* and each of the plurality of second locking protrusion grooves 463*b* may be alternately arranged along the circumferential direction.

An example of a coupling process between the valve assembly 800 and the support 400 will be described with reference to FIGS. 16 to 19.

Referring to FIGS. 16 and 17, the valve assembly 800 and the support 400 aligned in the correct assembly position may be prepared.

The first locking member 814 of the valve assembly 800 and the second locking member 463 of the support 400 may be provided to correspond to each other. For example, the first locking protrusion 814*a* of the first locking member 814 may correspond to the second locking protrusion groove 463*b* of the second locking member 463 with respect to the vertical direction, and the first locking protrusion groove 814*b* of the first locking member 814 may correspond to the second locking protrusion 463*a* of the second locking member 463 with respect to the vertical direction.

For example, the valve assembly 800 may include a first identifier 818 and the support 400 may include a second identifier 466. A user can easily identify an alignment position of the valve assembly 800 and the support 400 through the first identifier 818 and the second identifier 466. A user can correctly align the valve assembly 800 and the support 400 by matching the first identifier 818 and the second identifier 466 with respect to the vertical direction. For example, the first identifier 818 and the second identifier 466 may include an arrow mark. However, it is not limited thereto, and the first identifier 818 and the second identifier 466 may be provided in various shapes.

Referring to FIGS. 18 and 19, the valve assembly 800 may move between a first position P1 and a second position P2. The valve assembly 800 may be configured to be rotatable between the first position P1 and the second position P2.

The valve assembly 800 may be coupled to the valve coupler 460*a* by rotating in one direction. The valve assembly 800 may be released from the valve coupler 460*a* by rotating in a direction opposite to one direction while the valve assembly 800 is coupled to the valve coupler 460*a*.

Referring to FIG. 18, the valve assembly 800 may be vertically coupled to the valve holder 460 of the support 400. The valve assembly 800 may be inserted into the valve holder opening 461 of the valve holder 460. The first connection pipe 812 of the valve assembly 800 may be inserted into the valve holder opening 461. The valve assembly 800 may be located at the first position P1.

When the valve assembly 800 is positioned at the first position P1, the valve assembly 800 may be detachably coupled to the support 400. The first locking member 814 of the valve assembly 800 and the second locking member 463 of the support 400 may not interfere with each other. That is, the first locking member 814 may not be supported by the second locking member 463. For example, because the first locking protrusion 814*a* corresponds to the second locking protrusion groove 463*b* and the first locking protrusion groove 814*b* corresponds to the second locking protrusion 463*a*, the valve assembly 800 may be in a state in which the valve assembly 800 is allowed to be vertically separated from the valve holder 460 of the support 400.

Referring to FIG. 19, the valve assembly 800 may be rotated from the first position P1 and then positioned at the second position P2. In response to the rotation of the valve assembly 800, the first locking member 814 may be locked to the second locking member 463. For example, as the first locking member 814 is rotated in a state being located higher than the second locking member 463, the first locking member 814 may be supported by the second locking member 463. For example, the first locking protrusion 814*a* may correspond to the second locking protrusion 463*a*, and the first locking protrusion groove 814*b* may correspond to the second locking protrusion groove 463*b*. For example, the first locking protrusion 814*a* may overlap the second locking protrusion 463*a* in the up and down direction, and the first locking protrusion groove 814*b* may overlap the second locking protrusion groove 463*b* in the up and down direction. For example, the first locking protrusion 814*a* may be supported by the second locking protrusion 463*a*. As a result, when the valve assembly 800 is located at the second position P2, the valve assembly 800 may be prevented from being vertically separated from the support 400.

The valve assembly 800 may be moved to the second position P2 as the valve assembly 800 is rotated in the state of being located at the first position P1. For example, the valve assembly 800 may be moved to the second position P2 as the valve assembly 800 is rotated from the first position P1 to a first direction R1. As another example, the valve assembly 800 may be rotated from the first position P1 toward the first direction R1 by a first rotation amount, and then rotated in a second direction R2 by a second rotation amount less than the first rotation amount, and accordingly, the valve assembly 800 may be located at the second position P2. In this case, when the valve assembly 800 is primarily rotated in the first direction R1, the first locking member 814 may be locked to the second locking member 463. Thereafter, when the valve assembly 800 is secondarily rotated in the second direction R2, the valve assembly 800 may be fixed to the support 400 with in a range in which the first locking member 814 is not released from the second locking member 463. That is, the state in which, the valve assembly 800 is located at the second position P2, may represent all states in which the vertical separation between the valve assembly 800 and the support 400 is prevented because the valve assembly 800 is vertically locked to the support 400. For example, the state in which, the valve assembly 800 is located at the second position P2, may include a first state in which the valve assembly 800 is prevented from being separated from the support 400 by rotating from the first position P1 toward the first direction R1, and a second state in which the valve assembly 800 is prevented from being separated from the support 400 even when rotating from the first position P1 toward the second direction R2.

Meanwhile, the valve assembly 800 may be moved to the first position P1 as the valve assembly 800 is rotated in the state of being located at the second position P2. Accordingly, the valve assembly 800 may be released from the support 400. That is, the valve assembly 800 may be separated from the support 400 by rotation.

Figure 20:
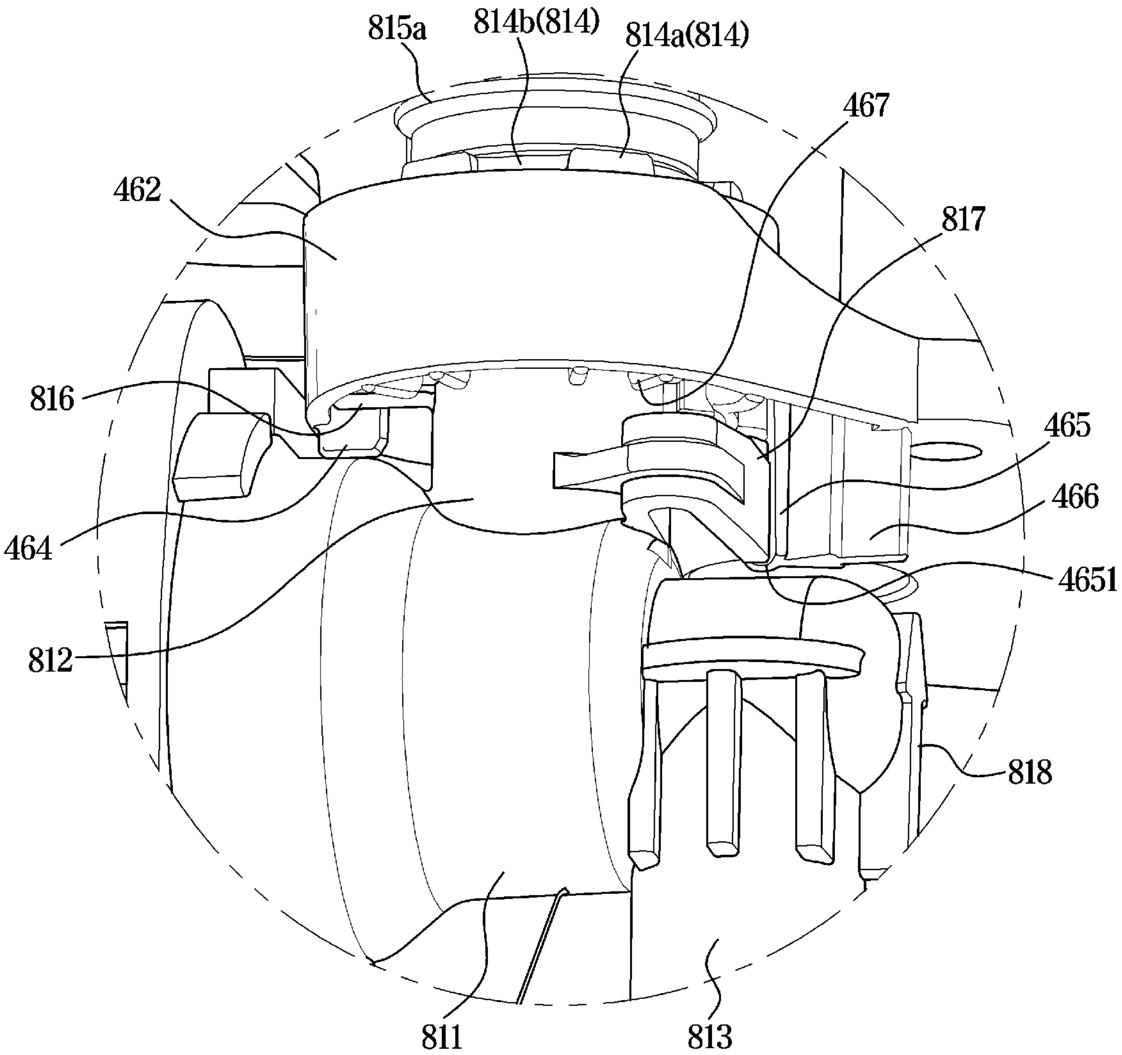
FIG. 20 is a partially enlarged view of the sump assembly of the dishwasher according to an embodiment of the disclosure.
Figure 21:
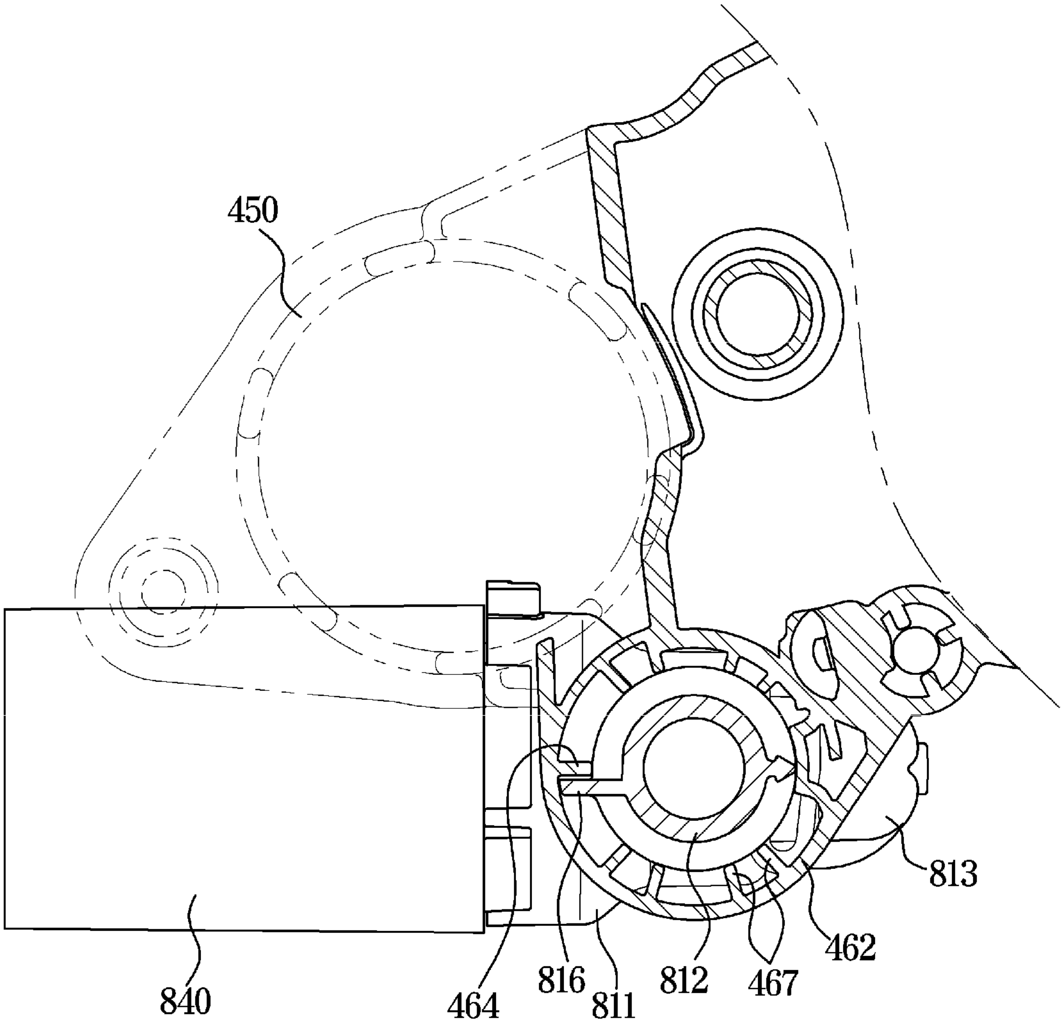
FIG. 21 is a top cross-sectional view illustrating a state in which the sump assembly of the dishwasher according to an embodiment of the disclosure is taken along a line.
Figure 22:
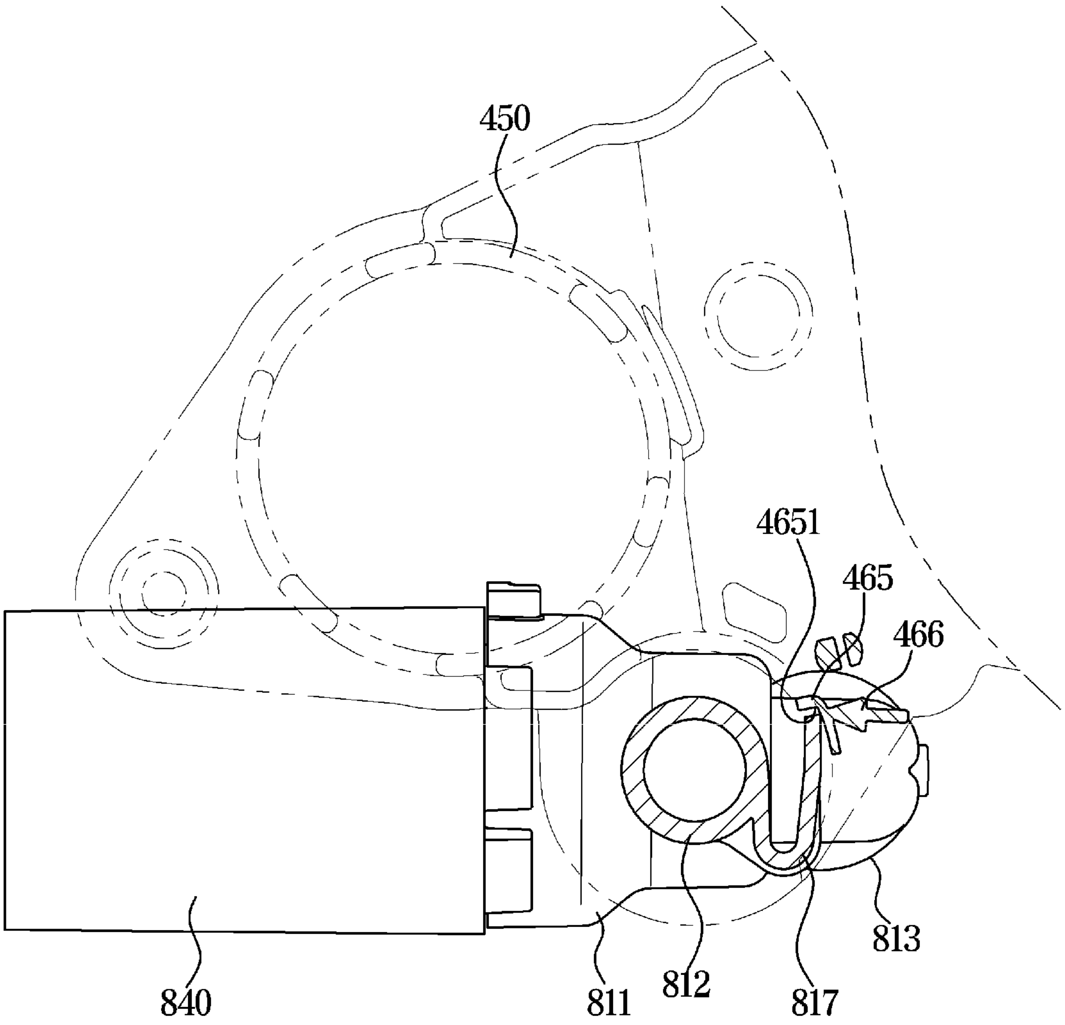
FIG. 22 is a top cross-sectional view illustrating a state in which the sump assembly of the dishwasher according to an embodiment of the disclosure is taken along a line.

FIG. 20 is a partially enlarged view of the sump assembly of the dishwasher according to an embodiment. FIG. 21 is a top cross-sectional view illustrating a state in which the sump assembly of the dishwasher according to an embodiment is taken along a line. FIG. 22 is a top cross-sectional view illustrating a state in which the sump assembly of the dishwasher according to an embodiment is taken along a line.

Referring to FIGS. 20 and 21, the valve assembly 800 may include a fixing rib 816. The fixing rib 816 may prevent the valve assembly 800 from being rotated from the second position P2 to the first direction R1. For example, the fixing rib 816 may prevent the valve assembly 800 from being further rotated beyond the second position P2 when the valve assembly 800 is rotated from the first position P1 toward the first direction R1. Accordingly, the valve assembly 800 may be accurately positioned at the second position P2. Further, it is possible to omit the unnecessary rotation of the valve assembly 800.

The fixing rib 816 may be inserted into the valve holder opening 461 to interfere with the valve holder body 462. For example, the fixing rib 816 may interfere with a rib counterpart 464 formed on the inner surface of the valve holder body 462.

The support 400 may include the rib counterpart 464. The rib counterpart 464 may be provided to correspond to the fixing rib 816. The rib counterpart 464 may protrude toward the valve assembly 800 from the inner surface of the valve holder body 462. A protruding amount of the rib counterpart 464 may be greater than or equal to a protruding amount of the coupling protrusion 467. For example, the rib counterpart 464 may be provided as one component of the valve coupler 460*a*. For example, the rib counterpart 464 may be provided as one component of the coupling protrusion 467.

For example, the fixing rib 816 may protrude radially from the outer surface of the first connection pipe 812. For example, the rib counterpart 464 may protrude radially inward from the inner surface of the valve holder body 462. However, this is merely exemplary, and the shape of the fixing rib 816 and the rib counterpart 464 may vary as long as the fixing rib 816 and the rib counterpart 464 interfere with each other so as to limit the first direction R1-rotation of the valve assembly 800.

Referring to FIGS. 20 and 22, the valve assembly 800 may include a hook 817. The hook 817 may prevent the valve assembly 800 from being rotated from the second position P2 to the second direction R2. For example, as the valve assembly 800 is rotated from the first position P1 toward the first direction R1 by the first rotation amount, the fixing rib 816 and the rib counterpart 464 may interfere with each other, and then, as the valve assembly 800 is rotated in the second direction R2 by the second rotation amount, the hook 817 may be hooked to the support 400. As a result, the valve assembly 800 may not be separated from the second position P2 and may be more stably mounted on the support 400.

The hook 817 may be formed in the first connection pipe 812. The hook 817 may interfere with a hook counterpart 465.

The support 400 may include the hook counterpart 465. The hook counterpart 465 may be provided to correspond with the hook 817. The hook counterpart 465 may extend downward from the valve holder body 462. For example, the hook counterpart 465 may be provided as one component of the valve coupler 460*a*.

For example, the hook 817 may protrude from the outer surface of the first connection pipe 812. The hook counterpart 465 may include a hook counterpart groove 4651 in which an end of the hook 817 is accommodated. For example, the hook counterpart 465 may have a bent shape. However, this is merely exemplary, and the shape of the hook 817 and the hook counterpart 465 may vary as long as the hook 817 and the hook counterpart 465 interfere with each other so as to limit the second direction R2-rotation of the valve assembly 800.

As described above, the valve assembly 800 may be easily assembled to or disassembled from the valve holder 460 of the support 400 by a simple rotation operation. As a result, the assemblability of the valve assembly 800 may be improved.

While the different guide members described herein have differently configured connections and couplings, it is understood that embodiments of the disclosure may include multiple guide members with the same or similar connection and/or coupling configurations. Additionally, embodiments of the disclosure may include guide members with connection and/or coupling configurations that are oppositely arranged to those discussed herein.

As is apparent from the above description, a sump assembly of a dishwasher may include a compact structure.

Further, a connector may be easily fixed without a separate process or a separate component.

Further, a valve assembly may be easily fixed without a separate component.

Further, a dishwasher may have effects of reducing a production cost and an assembly cost and effects of improving a quality.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A dishwasher comprising:
- a washing chamber;
- a spray unit configured to spray wash water into the washing chamber;
- a distribution chamber including a lower port through which wash water flows in and out of the distribution chamber;
- a distribution cover configured to cover the distribution chamber, and including an upper port connected to the spray unit so that the wash water in the distribution chamber passes through the upper port to be supplied to the spray unit;
- a guide member connected to the lower port of the distribution chamber so as to guide wash water; and
- a support detachably coupled to a lower side of the distribution chamber, and including:

a holder formed in a hollow shape and configured to hold one side of the guide member; and a coupler formed on the holder to fix the guide member so as to allow the guide member to correspond to the lower port through the holder.

2. The dishwasher of claim 1, wherein the holder of the support has a predetermined height.

3. The dishwasher of claim 1, wherein the coupler of the support protrudes upward from the holder.

4. The dishwasher of claim 1, further comprising:

a water storage chamber provided to store wash water in the washing chamber; and a pump configured to pump wash water from the water storage chamber to the distribution chamber, wherein the guide member is provided to connect the pump and the lower port.

5. The dishwasher of claim 4, wherein the guide member includes:

a connection flange configured to be coupled to an outer surface of the lower port, and an extension portion extending from the connection flange to be locked to the coupler, so as to cover at least a portion of the holder.

6. The dishwasher of claim 5, wherein the extension portion includes:

a first extension portion extending radially outward from an upper end of the connection flange to cover an upper end of the holder, and a second extension portion extending downward from the first extension portion to cover an outer surface of the holder.

7. The dishwasher of claim 5, wherein the guide member includes:

a sealing protrusion protruding from an inner surface of the connection flange toward the lower port to prevent leakage between the lower port and the guide member.

8. The dishwasher of claim 4, wherein the coupler of the support includes a plurality of coupling protrusions protruding upward from an upper end of the holder, the guide member includes a plurality of coupling protrusion holes, and the plurality of coupling protrusions are configured to be inserted into the plurality of coupling protrusion holes.

9. The dishwasher of claim 4, wherein the guide member has a curved shape configured to reduce a pressure loss of the wash water guided from the pump to the distribution chamber.

10. The dishwasher of claim 4, wherein the guide member includes silicon or an ethylene propylene diene monomer (EPDM) material.

11. The dishwasher of claim 1, wherein the coupler of the support protrudes from an inner surface of the holder.

12. The dishwasher of claim 1, further comprising:

a water tank provided to store the wash water in the distribution chamber, wherein the guide member is configured to connect the lower port and the water tank.

13. The dishwasher of claim 12, wherein the guide member includes:

a connection pipe coupled to an inner surface of the lower port, and a plurality of first locking protrusions protruding radially outward from an outer surface of the connection pipe and arranged spaced apart from each other, and the coupler of the support includes:

a plurality of second locking protrusions protruding radially inward from an inner surface of the holder and arranged spaced apart from each other, and a plurality of locking protrusion grooves arranged between two mutually adjacent second locking protrusions among the plurality of second locking protrusions.

14. The dishwasher of claim 13, wherein the connection pipe is rotatable between a first position in which the connection pipe is inserted into the holder to allow the plurality of first locking protrusions of the guide member to pass through the plurality of locking protrusion grooves of the holder, and a second position in which the plurality of first locking protrusions are supported by the plurality of second locking protrusions.

15. The dishwasher of claim 13, wherein the guide member includes:

a sealing protrusion protruding from an outer surface of the connection pipe toward the lower port to prevent leakage between the lower port and the guide member.

16. A dishwasher comprising:

a washing chamber;

a spray unit configured to spray wash water into the washing chamber;

a distribution chamber including a lower port through which wash water flows in and out;

a distribution cover configured to cover the distribution chamber, and including an upper port connected to the spray unit to supply the wash water in the distribution chamber to the spray unit;

a guide member connected to the lower port of the distribution chamber so as to guide wash water; and a support detachably coupled to a lower side of the distribution chamber, and including:

a holder formed in a hollow shape and configured to hold one side of the guide member; and a coupler formed on the holder to fix the guide member so as to allow the guide member to correspond to the lower port through the holder, wherein the guide member includes:

a connection flange configured to be coupled to an outer surface of the lower port, and an extension portion extending from the connection flange to be locked to the coupler, so as to cover at least a portion of the holder.

17. A dishwasher comprising:

a washing chamber;

a spray unit configured to spray wash water into the washing chamber;

a distribution chamber including a lower port through which wash water flows in and out;

a distribution cover configured to cover the distribution chamber, and including an upper port connected to the spray unit to supply the wash water in the distribution chamber to the spray unit;

a guide member connected to the lower port of the distribution chamber so as to guide wash water; and a support detachably coupled to a lower side of the distribution chamber, and including:

a holder formed in a hollow shape and configured to hold one side of the guide member; and a coupler formed on the holder to fix the guide member so as to allow the guide member to correspond to the lower port through the holder, wherein the guide member includes:

a connection pipe coupled to an inner surface of the lower port, and a plurality of first locking protrusions protruding radially outward from an outer surface of the connection pipe and arranged spaced apart from each other, and the coupler of the support includes:

a plurality of second locking protrusions protruding radially inward from an inner surface of the holder and arranged spaced apart from each other, and a plurality of locking protrusion grooves arranged between two mutually adjacent second locking protrusions among the plurality of second locking protrusions.

* * * * *